(12) United States Patent
Cai et al.

(10) Patent No.: US 11,044,664 B2
(45) Date of Patent: Jun. 22, 2021

(54) ENHANCED INTERFACES FOR NETWORK SLICE SELECTION BASED ON CHARGING RULES

(71) Applicant: Nokia Solutions and Networks Oy, Espoo (FI)

(72) Inventors: Yigang Cai, Naperville, IL (US); Ranjan Sharma, New Albany, OH (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/611,842

(22) PCT Filed: Jun. 29, 2017

(86) PCT No.: PCT/US2017/039992
§ 371 (c)(1),
(2) Date: Nov. 7, 2019

(87) PCT Pub. No.: WO2019/005069
PCT Pub. Date: Jan. 3, 2019

(65) Prior Publication Data
US 2020/0169951 A1  May 28, 2020

(51) Int. Cl.
*H04W 48/18* (2009.01)
*H04W 76/11* (2018.01)
(Continued)

(52) U.S. Cl.
CPC ......... *H04W 48/18* (2013.01); *H04L 12/1407* (2013.01); *H04M 15/66* (2013.01);
(Continued)

(58) Field of Classification Search
CPC ....... H04W 48/18; H04W 76/11; H04W 4/24; H04W 8/24; H04L 12/1407; H04M 15/66
(Continued)

(56) References Cited

U.S. PATENT DOCUMENTS 9,961,624 B1 * 5/2018 Zait .................. H04L 47/78
2011/0270722 A1  11/2011 Cai et al.
(Continued)

OTHER PUBLICATIONS

D1-CATT: "Service Triggered Network Slice Selection Procedure" Jul. 14, 2016.
(Continued)

*Primary Examiner* — Mong-Thuy T Tran
(74) *Attorney, Agent, or Firm* — Duft & Bornsen, PC

(57) ABSTRACT

Systems and methods of a network that implements network slicing. In one embodiment, the system includes an account charging server that determines a plurality of charging rules for a UE that are each mapped to a different network slice of the network, a policy control server that identifies the charging rules, and a slice selection server that selects a network slice for the UE based on the charging rules. The system further includes an interface between the policy control server and the account charging server that supports a transaction based on Diameter protocol that includes a request/response. A first Attribute Value Pair (AVP) is defined for the response to identify a charging rule, and a second AVP is defined for the response to identify a network slice that is mapped to the charging rule.

18 Claims, 12 Drawing Sheets

(51) Int. Cl.
*H04L 12/14* (2006.01)
*H04M 15/00* (2006.01)
*H04W 4/24* (2018.01)
*H04W 8/24* (2009.01)

(52) U.S. Cl.
CPC .............. *H04W 4/24* (2013.01); *H04W 8/24* (2013.01); *H04W 76/11* (2018.02)

(58) Field of Classification Search
USPC ......................................................... 370/329
See application file for complete search history.

(56) References Cited

U.S. PATENT DOCUMENTS

| | | | | |
|---|---|---|---|---|
| 2014/0094138 | A1* | 4/2014 | Saker | H04M 15/8214 455/406 |
| 2016/0269929 | A1* | 9/2016 | Livanos | H04L 12/1407 |
| 2017/0013502 | A1* | 1/2017 | Baniel | H04W 28/0289 |
| 2017/0367036 | A1* | 12/2017 | Chen | H04L 43/08 |
| 2018/0176141 | A1* | 6/2018 | Gupta | H04L 61/203 |
| 2018/0176389 | A1* | 6/2018 | Kumar | H04M 15/765 |
| 2018/0262625 | A1* | 9/2018 | McCarley | H04L 12/1407 |
| 2018/0309584 | A1* | 10/2018 | Chai | H04L 12/1414 |
| 2019/0014219 | A1* | 1/2019 | Jung | H04L 12/1407 |
| 2019/0379609 | A1* | 12/2019 | Senarath | H04L 41/0896 |
| 2019/0386894 | A1* | 12/2019 | Hu | H04L 41/0893 |

OTHER PUBLICATIONS

D3-3GPP Ts 29.219 Technical Specification Group Core Network and Terminals; Policy and Charging Control: Spending Limit Reporting over Sy reference point (Release 13), Jan. 2017.

D4-3GPP TR 29.890; Technical Specification Group Core Network and Terminals; Study on CT WG3 Aspects of 5G System-Phase 1; Stage 3 (Release 15), May 2017.

D5-3GPP Technical Specification Group Services and System Aspects; System Architecture for the 5G System; Stage 2 (Release 15), Jun. 1, 2017.

NPL-European Office Action; Application 17739439.2; dated Mar. 3, 2021.

* cited by examiner

ENHANCED INTERFACES FOR NETWORK SLICE SELECTION BASED ON CHARGING RULES

RELATED APPLICATIONS

The present application is a National Stage entry of PCT application No. PCT/US2017/039992 filed on Jun. 29, 2017, which is fully incorporated herein by reference.

FIELD OF THE INVENTION

The invention is related to the field of communication systems and, in particular, to network slicing.

BACKGROUND

Next generation wireless networks (e.g., $5^{th}$ Generation or 5G) will need to support demands from a variety of users, machines, industries, organizations, etc. Thus, next generation wireless networks will have to support a variety of requirements for latency, throughput, capacity, and availability. To provide support for different types of services, use-cases, and business models, the physical network may be partitioned into multiple virtual instances, which is referred to as network slicing. Network slicing offers an effective way to meet different use-case requirements and exploit the benefits of a common network infrastructure. Unfortunately, architectures presently suggested for next generation networks do not adequately support network slicing.

SUMMARY

Embodiments described herein provide enhanced interfaces that support network slicing. A communication device (e.g., User Equipment (UE)) may be authorized to access multiple network slices that are apportioned within a network. As described herein, a slice selection server implements a Slice Selection Function (SSF) that selects a network slice for the communication device. When selecting the network slice for the device, the SSF may process charging rules that are mapped to the network slices authorized for the device. The SSF may acquire the charging rules for the device from a policy control server and/or an account charging server. As described herein, the interfaces between the SSF, the policy control server, and the account charging server are enhanced to support network slicing.

One embodiment comprises a system of a network that implements network slicing. The system includes an account charging server that determines a plurality of charging rules for a UE that are each mapped to a different network slice of the network, a policy control server that identifies the charging rules determined by the account charging server, and a slice selection server that acquires the charging rules from the policy control server and selects a network slice for the UE based on the charging rules. The system includes a first interface between the policy control server and the account charging server that supports a first transaction based on Diameter protocol that includes a first request from the policy control server to the account charging server and a first response from the account charging server to the policy control server. A first Attribute Value Pair (AVP) is defined for the first response to identify a charging rule, and a second AVP is defined for the first response to identify a network slice that is mapped to the charging rule.

In another embodiment, a third AVP is defined for the first response to identify a validity timer assigned to the charging rule.

In another embodiment, the first interface comprises the Sy interface, and the first response comprises a Diameter Spending Limit Answer (SLA) of the Sy interface.

In another embodiment, a fourth AVP is defined for the first request to specify network slicing information, a fifth AVP is defined for the fourth AVP to identify a network slice identifier (ID), and a sixth AVP is defined for the fourth AVP to identify a service category associated with the network slice ID. The service category includes one of Enhanced Mobile BroadBand (eMBB), Ultra-Reliable Low-Latency Communication (uRLLC), and Massive Machine-Type Communications (mMTC).

In another embodiment, the first interface comprises the Sy interface, and the first request comprises a Diameter Spending Limit Request (SLR) of the Sy interface.

In another embodiment, the system includes a second interface between the slice selection server and the policy control server that supports a second transaction based on the Diameter protocol that includes a second request from the slice selection server to the policy control server and a second response from the policy control server to the slice selection server. A seventh AVP is defined for the second response to identify the charging rule, and an eighth AVP is defined for the second response to identify the network slice that is mapped to the charging rule.

In another embodiment, a ninth AVP is defined for the second response to identify a validity timer assigned to the charging rule.

In another embodiment, the second interface comprises the Gx interface, the second response comprises a Diameter Credit Control Answer (CCA) of the Gx interface, and the seventh AVP, the eighth AVP, and the ninth AVP are defined in a Charging-Rule-Definition AVP of the Diameter CCA.

In another embodiment, a tenth AVP is defined for the second request to specify network slicing information, an eleventh AVP is defined for the tenth AVP to identify a network slice identifier (ID), and a twelfth AVP is defined for the tenth AVP to identify a service category associated with the network slice ID.

In another embodiment, the second interface comprises the Gx interface, and the second request comprises a Diameter Credit Control Request (CCR) of the Gx interface.

Another embodiment comprises system of a network that implements network slicing. The system includes a first server that determines a plurality of charging rules for a UE that are each mapped to a different network slice of the network, a second server that implements a Slice Selection Function (SSF) configured to select a network slice for the UE based on the charging rules, and an interface between the first server and the second server to support a transaction comprising a request and a response that is based on Diameter protocol. A first AVP is defined for the response from the second server to the first server to identify a charging rule, and a second AVP is defined for the response to identify a network slice that is mapped to the charging rule.

In another embodiment, a third AVP is defined for the response to identify a validity timer assigned to the charging rule.

In another embodiment, the interface comprises the Gx interface, the response comprises a Diameter Credit Control Answer (CCA) of the Gx interface, and the first AVP, the second AVP, and the third AVP are defined in a Charging-Rule-Definition AVP of the Diameter CCA.

In another embodiment, a fourth AVP is defined for the request from the first server to the second server to specify network slicing information, a fifth AVP is defined for the fourth AVP to identify a network slice ID, and a sixth AVP is defined for the fourth AVP to identify a service category associated with the network slice ID.

In another embodiment, the request comprises a Diameter Credit Control Request (CCR) of the Gx interface.

Another embodiment comprises a system of a network that implements network slicing. The system includes an account charging server, a policy control server, and a slice selection server. The system includes an Sy interface between the policy control server and the account charging server that is enhanced to indicate a plurality of charging rules for a UE from the account charging server to the policy control server, where the charging rules are each mapped to a different network slice of the network. The system includes a Gx interface between the slice selection server and the policy control server that is enhanced to deliver the plurality of charging rules from the policy control server to the slice selection server. The slice selection server selects a network slice for the UE based on the charging rules.

In another embodiment, a first request from the policy control server to the account charging server over the Sy interface comprises a Diameter Spending Limit Request (SLR), a first response from the account charging server to the policy control server over the Sy interface comprises a Diameter Spending Limit Answer (SLA), a first AVP is defined for the Diameter SLA to identify a charging rule, a second AVP is defined for the Diameter SLA to identify a network slice that is mapped to the charging rule, and a third AVP is defined for the Diameter SLA to identify a validity timer assigned to the charging rule.

In another embodiment, a second request from the slice selection server to the policy control server over the Gx interface comprises a Diameter Credit Control Request (CCR), a second response from the policy control server to the slice selection server over the Gx interface comprises a Diameter Credit Control Answer (CCA), a fourth AVP is defined for the Diameter CCA to identify the charging rule, a fifth AVP is defined for the Diameter CCA to identify the network slice that is mapped to the charging rule, and a sixth AVP is defined for the Diameter CCA to identify the validity timer assigned to the charging rule.

In another embodiment, a seventh AVP is defined for the Diameter SLR to specify network slicing information, an eighth AVP is defined for the seventh AVP to identify a network slice identifier (ID); and a ninth AVP is defined for the seventh AVP to identify a service category associated with the network slice ID.

In another embodiment, a tenth AVP is defined for the Diameter CCR to specify the network slicing information, an eleventh AVP is defined for the tenth AVP to identify the network slice ID, and a twelfth AVP is defined for the tenth AVP to identify the service category associated with the network slice ID.

Another embodiment comprises a method operable in a network that implements network slicing, where the network includes an account charging server, a policy control server, and a slice selection server. The method includes implementing an Sy interface between the policy control server and the account charging server that is enhanced to indicate a plurality of charging rules for a UE from the account charging server to the policy control server, where the charging rules are each mapped to a different network slice of the network. The method further includes implementing a Gx interface between the slice selection server and the policy control server that is enhanced to deliver the plurality of charging rules from the policy control server to the slice selection server, where the slice selection server selects a network slice for the UE based on the charging rules.

In another embodiment, the method further comprises sending a Diameter Spending Limit Request (SLR) from the policy control server to the account charging server over the Sy interface, and sending a Diameter Spending Limit Answer (SLA) from the account charging server to the policy control server over the Sy interface. A first Attribute Value Pair (AVP) is defined for the Diameter SLA to identify a charging rule, a second AVP is defined for the Diameter SLA to identify a network slice that is mapped to the charging rule, and a third AVP is defined for the Diameter SLA to identify a validity timer assigned to the charging rule.

In another embodiment, the method further comprises sending a Diameter Credit Control Request (CCR) from the slice selection server to the policy control server over the Gx interface, and sending a Diameter Credit Control Answer (CCA) from the policy control server to the slice selection server over the Gx interface. A fourth AVP is defined for the Diameter CCA to identify the charging rule, a fifth AVP is defined for the Diameter CCA to identify the network slice that is mapped to the charging rule, and a sixth AVP is defined for the Diameter CCA to identify the validity timer assigned to the charging rule.

In another embodiment, a seventh AVP is defined for the Diameter SLR to specify network slicing information, an eighth AVP is defined for the seventh AVP to identify a network slice identifier (ID), a ninth AVP is defined for the seventh AVP to identify a service category associated with the network slice ID, and the service category includes one of Enhanced Mobile BroadBand (eMBB), Ultra-Reliable Low-Latency Communication (uRLLC), and Massive Machine-Type Communications (mMTC).

In another embodiment, a tenth AVP is defined for the Diameter CCR to specify the network slicing information, an eleventh AVP is defined for the tenth AVP to identify the network slice ID, and a twelfth AVP is defined for the tenth AVP to identify the service category associated with the network slice ID.

Another embodiment comprises a system of a network that implements network slicing. The system includes a first means for determining a plurality of charging rules for a UE that are each mapped to a different network slice of the network, a second means for identifying the charging rules determined by the first means, and a third means for acquiring the charging rules from the second means and for selecting a network slice for the UE based on the charging rules. The system includes an interface between the first means and the second means that supports a transaction based on Diameter protocol that includes a request from the first means to the second means and a response from the first means to the second means. A first Attribute Value Pair (AVP) is defined for the response to identify a charging rule, and a second AVP is defined for the response to identify a network slice that is mapped to the charging rule.

Another embodiment comprises system of a network that implements network slicing. The system includes a first means for determining a plurality of charging rules for a UE that are each mapped to a different network slice of the network, and a second means for implementing a Slice Selection Function (SSF) configured to select a network slice for the UE based on the charging rules. The system includes an interface between the first means and the second means to support a transaction comprising a request and a response that is based on Diameter protocol. A first AVP is defined for the response from the second means to the first means to identify a charging rule, and a second AVP is defined for the response to identify a network slice that is mapped to the charging rule.

Another embodiment comprises a system of a network that implements network slicing. The system includes a first means for determining a plurality of charging rules for a UE that are each mapped to a different network slice of the network, a second means for identifying the charging rules determined by the first means, and a third means for acquiring the charging rules from the second means and for selecting a network slice for the UE based on the charging rules. The system includes an Sy interface between the second means and the first means that is enhanced to indicate a plurality of charging rules for a UE from the first means to the second means, where the charging rules are each mapped to a different network slice of the network. The system includes a Gx interface between the third means and the second means that is enhanced to deliver the plurality of charging rules from the second means to the third means.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
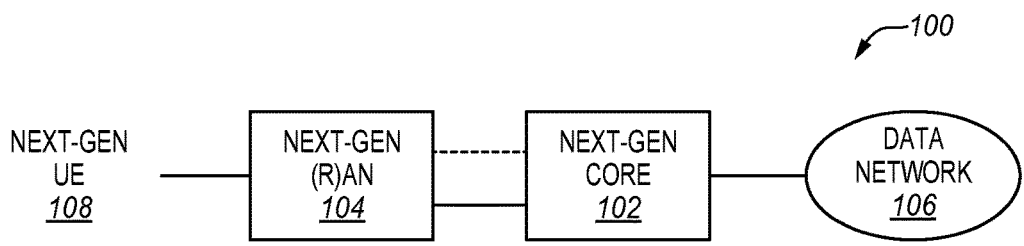
FIG. 1 illustrates a high-level architecture of a next generation mobile network.

FIG. 1 illustrates a high-level architecture of a next generation mobile network 100 as described in Third Generation Partnership Project (3GPP) TR 23.799 (version 14.0.0), which is incorporated by reference as if fully included herein. Network 100 includes a next generation (Next-Gen) core network 102 and a next generation access network and/or radio access network ((R)AN) 104. Access network 104 may support Evolved-UMTS Terrestrial Radio Access Network (E-UTRAN) access, Wireless Local Area Network (WLAN) access, fixed access, satellite radio access, new Radio Access Technologies (RAT), etc. Core network 102 interconnects access network 104 with a data network 106. Data network 106 may be an operator external public or private data network, or an intra-operator data network (e.g., for IMS services). Next generation User Equipment (UE) 108 is able to attach to access network 104 to access services from core network 102.

One goal of next generation networks (e.g., 5G) is to enable network slicing. With network slicing, a physical network may be partitioned into multiple virtual instances so that a mobile operator can offer support for different types of services for different types of customer segments. A network slice is a logical representation of network functions and corresponding resource requirements necessary to provide the required telecommunication services and network capabilities. For example, a mobile operator may provide a network slice for Machine-Type Communications (MTC) devices or Internet of Things (IoT) devices, which offers a reliable data-only service with a given latency, data rate, and security level. The mobile operator may also provide a network slice with very high throughput, high data speeds, and low latency for real-time or on-demand services. The mobile operator may provide other network slices that provide the required telecommunication services and network capabilities. The core network part of a network slice is referred to as the CN slice, and the radio network part of a network slice is referred to as the RAN Slice.

Figure 2:
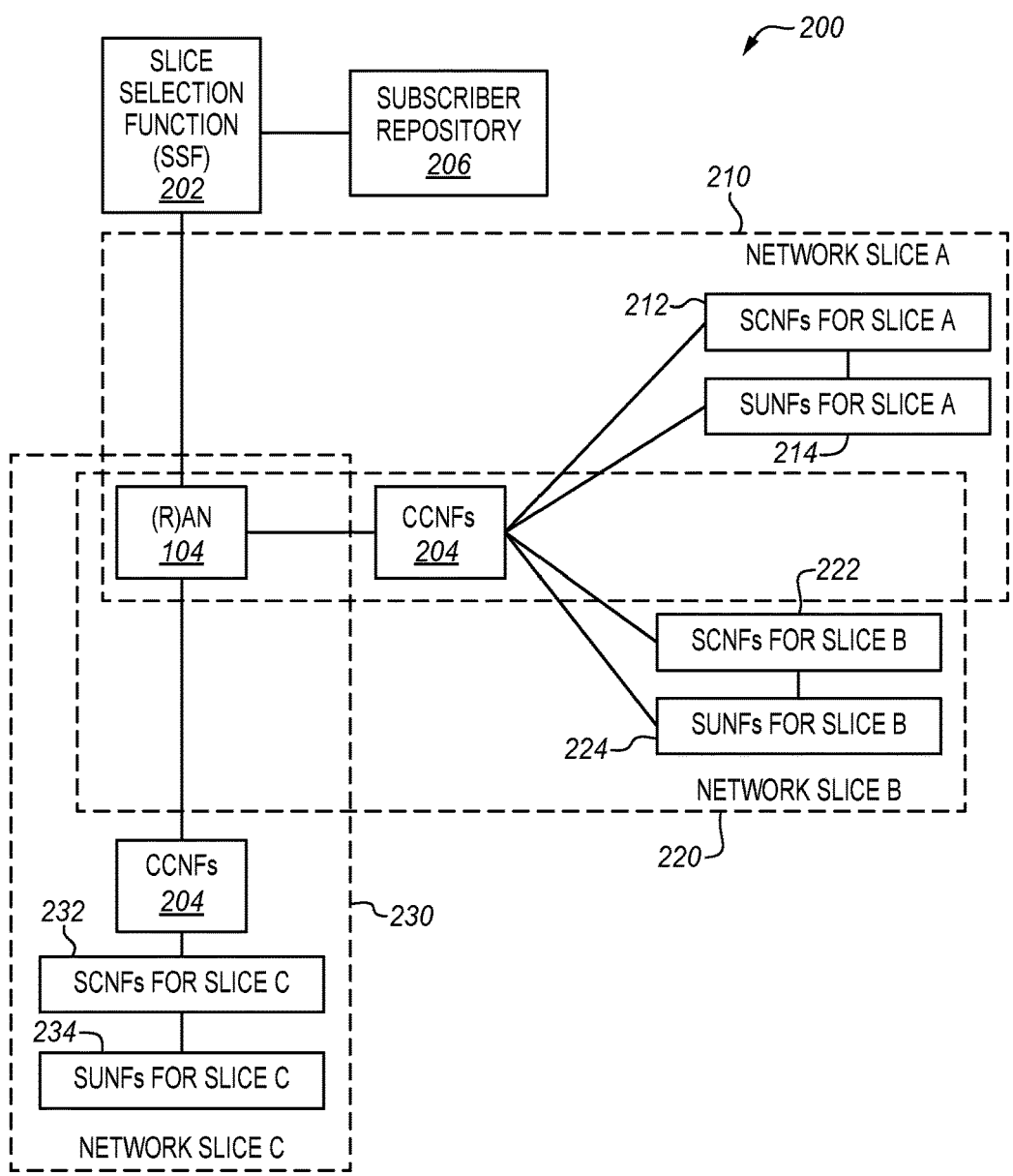
FIG. 2 illustrates a network slicing architecture.

FIG. 2 illustrates a network slicing architecture 200, as is further described in 3GPP TR 23.799. In this architecture, the control plane of core network 102 (see FIG. 1) is partitioned into three types of Network Functions (NFs). A network function is a processing function in a network, which may be implemented as a network element on dedicated hardware, as a software instance running on dedicated hardware, or as a virtualized function instantiated on an appropriate platform (e.g., on a cloud infrastructure). One type of network function is a Slice Selection Function (SSF) 202. SSF 202 handles an initial attach request and session establishment request from UE 108 by selecting an appropriate network slice for UE 108 based on subscription information, UE usage type, service type, and UE capabilities. SSF 202 connects with a subscriber repository 206 (e.g., Home Subscriber Server (HSS) and/or Subscriber Profile Repository (SPR)), which is a database or databases that stores subscriber-related information, which may be referred to as subscriber profiles. Another type of network function is a Common Control Plane Network Function (CCNF) 204. CCNF 204 is the control plane entry function that is shared among different network slices, and includes the Mobility Management (MM) function, the authentication (AU) function, and the NAS Proxy function. Another type of network function is a Slice-Specific Control Plane Network Function (SCNF). A SCNF is allocated to a particular network slice (i.e., not shared among network slices), and has no direct interface with access network 104. The NFs that are allocated to a particular network slice are configured to support a particular set of functionalities, such as session management and QoS framework.

The network in FIG. 2 is partitioned into three network slices: network slice A 210, network slice B 220, and network slice C 230. SCNFs 212 are allocated to network slice A 210 for core network 102, SCNFs 222 are allocated to network slice B 220 for core network 102, and SCNFs 232 are allocated to network slice C 230 for core network 102. Slice-Specific User Plane Network Functions (SUNF) are also allocated to each network slice, such as SUNFs 214 for network slice A 210, SUNFs 224 for network slice B 220, and SUNFs 234 for network slice C 230. Each network slice 210, 220, and 230 is associated with a network slice ID (e.g., NeS-ID or slice instance ID). The NeS-ID may be separated into two parts. One part is the type of common CP (CCNF ID). When different types of network slices share a CCNF, the CCNF needs to accommodate the requirements from the different network slices. The type of common CP reflects the requirements for the CCNF. Another part of the NeS-ID is the type of slice-specific part, which indicates the type of non-shared slice CN parts.

Figure 3:
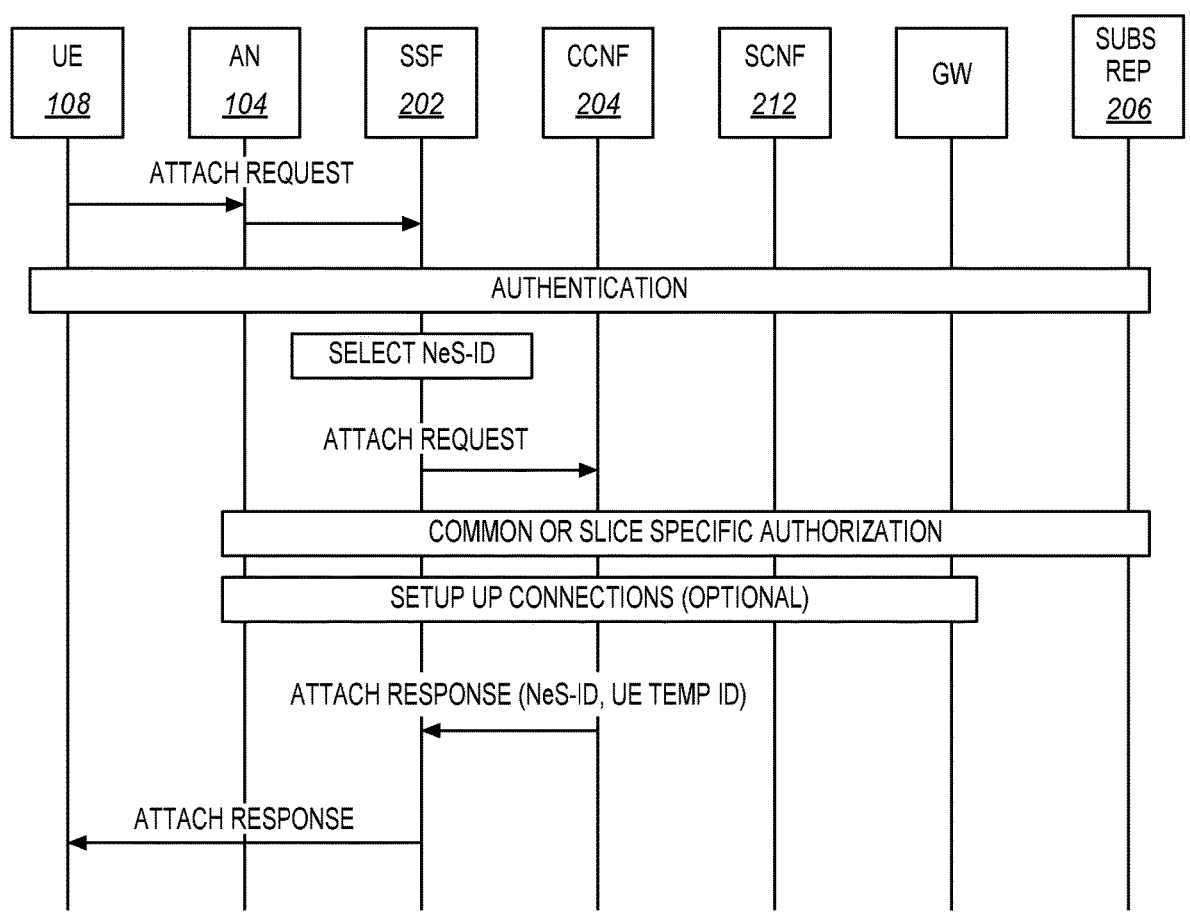
FIG. 3 illustrates an initial attach procedure for a UE.

FIG. 3 illustrates an initial attach procedure for UE 108. When UE 108 first attaches to the network, UE 108 sends an initial attach request to access network (AN) 104 including UE capabilities and the requested service (optional). Access network 104 forwards the attach request to SSF 202. SSF 202 accesses the subscriber repository 206, and authenticates UE 108 to determine whether it is permitted to access the network. SSF 202 selects the appropriate network slice type as well as the related NeS-ID for a network slice or Network Slice Instance (NSI) based on the information received from UE 108 in the attach request and a subscriber profile retrieved from subscriber repository 206, such as UE's subscription information, UE usage type, service type, and UE capability. SSF 202 forwards the attach request with the NeS-ID to CCNF 204 and/or to SCNF 212 of the selected network slice. CCNF 204 performs an authentication/slice authorization procedure by checking the UE identity with subscriber repository 206. The procedure determines whether UE 108 is authorized to access this network slice. At this point, UP (user plane) connections for a default or UE-specified type network slice may be set up. CCNF 204 sends an attach response to SSF 202 that includes the NeS-ID and a UE Temporary ID. The UE Temporary ID is assigned by CCNF 204, and may consist of the routing information to CCNF 204 and a UE-specific identity (similar to an M-TMSI). SSF 202 sends the attach response to UE 108 via access network 104 with the NeS-ID and the UE Temporary ID. When UE 108 receives the NeS-ID and the UE Temporary ID, it may use this information to assist in future network slice selection (e.g., when UE 108 detaches from the network and re-attaches again). If UE 108 re-attaches to the network after receiving the NeS-ID and the UE Temporary ID, it may send an attach request to access network 104 with the NeS-ID and the UE Temporary ID. If the UE Temporary ID is valid, then access network 104 may forward the attach request directly to CCNF 204 based on the UE Temporary ID. Otherwise, access network 104 selects CCNF 204 based on the NeS-ID.

If no UP connection is setup or if only a default UP connection is setup for UE 108 and it requests a service that is provided by another network slice, then another UP connection for UE 108 is setup during a new session establishment procedure.

Figure 4:
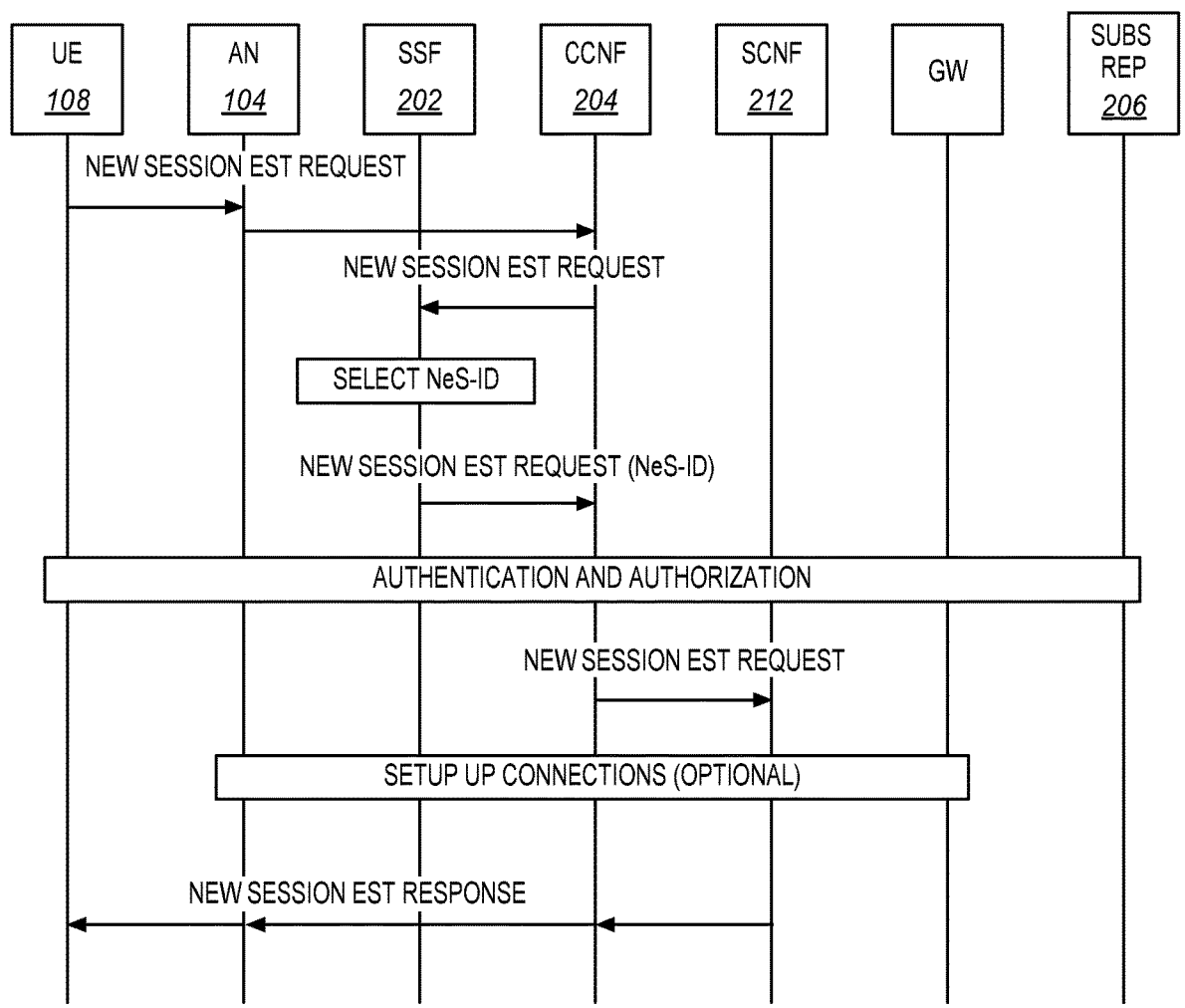
FIG. 4 illustrates a new session establishment procedure for a UE.

FIG. 4 illustrates a new session establishment procedure for UE 108. To begin, UE 108 sends a request for establishment of a new session to access network 104. Access network 104 forwards the new session establishment request to CCNF 204 based on the UE Temporary ID, which was allocated during the attach procedure. If CCNF 204 does not know which SCNF part to handle this request, then CCNF 204 forwards the new session establishment request to SSF 202 to determine which network slice to select. SSF 202 selects the appropriate new NeS-ID. It is assumed that the new NeS-ID shared the same type of CCNF, but with a different type of SCNF part. SSF 202 sends the new session establishment request with the NeS ID to CCNF 204. If UE 108 has already been authenticated and the new network slice requires the same authentication procedure, then CCNF 204 only performs the authorization procedure. If CCNF 204 is a common function for all network slices, then the authentication procedure is only performed for the first network slice that is associated with CCNF 204. CCNF 204 forwards the new session establishment request to SCNF 212. SCNF 212 performs a session management procedure to setup the UP connection, and sends a new session establishment response to UE 108 through CCNF 204 and access network 104.

Once UE 108 is assigned to a CCNF during the attach procedure, the signaling connection between UE 108 and the CCNF is based on the UE Temporary ID (i.e., the RAN part of the network slice routes UE signaling to the CCNF based on the UE Temporary ID). The CCNF is logically part of all the Network Slice Instances (NSIs) that are being used for UE 108. When a new NSI is added to or an existing NSI is removed from the set of network slices used by UE 108, a more optimal CCNF may be selected to serve the new set of NSIs used for UE 108.

Network slice or NSI selection as described above enables the selection of a set of network functions to deliver a certain service and/or for a certain use case. A network slice offers particular system behaviors to UE 108 that are tailored to application needs from the standpoint of specific control plane or user plane behaviors, and offers UE 108 access to resources allocated for a specific service or application domain, or a tenant (e.g., minimum level of guaranteed resources or aggregate number of subscribers allowed to access the service at any point in time). In selection of a network slice, a Multi-Dimensional Descriptor (MDD) may be configured in UE 108 and provided to the network during the attach procedure. An MDD may include the following components: a first component identifying a tenant, and a second component identifying network behaviors for the target network service identified by the slice type. SSF 202 may use the MDD along with the UE's capability, the UE's location, and subscription data to select a network slice. By leveraging the UE's capability and subscription data from subscriber repository 206 in addition to the MDD, UE 108 is authorized at attach time to access certain NSIs that correspond to certain MDD values.

The binding of UE 108 to a network slice happens when the network receives the attach request from UE 108. As presently suggested, the selection of a network slice by SSF 202 is based on subscription information, UE usage type, service type, UE capabilities, and MDD, and each network slice is mapped to static information and policies. From a usage perspective, static policies are insufficient to handle subscriptions that change with usage and exhibit dynamism. In other words, statically-defined policies can only address a few profile conditions, but cannot fulfill a dynamic profile need. For charging, the subscriber's service plan and policy varies with several factors, such as initial Quality of Service (QoS) allocation, already consumed quota, temporal details of the billing cycle, whether the subscriber is within the network or in a partner network, whether smart charging is active, whether the subscriber has opted for spending limits and is therefore subject to close monitoring around when the consumed quota approaches a threshold, etc. In the embodiments described herein, charging rules for UEs are acquired to select an appropriate network slice for the UEs.

Figure 5:
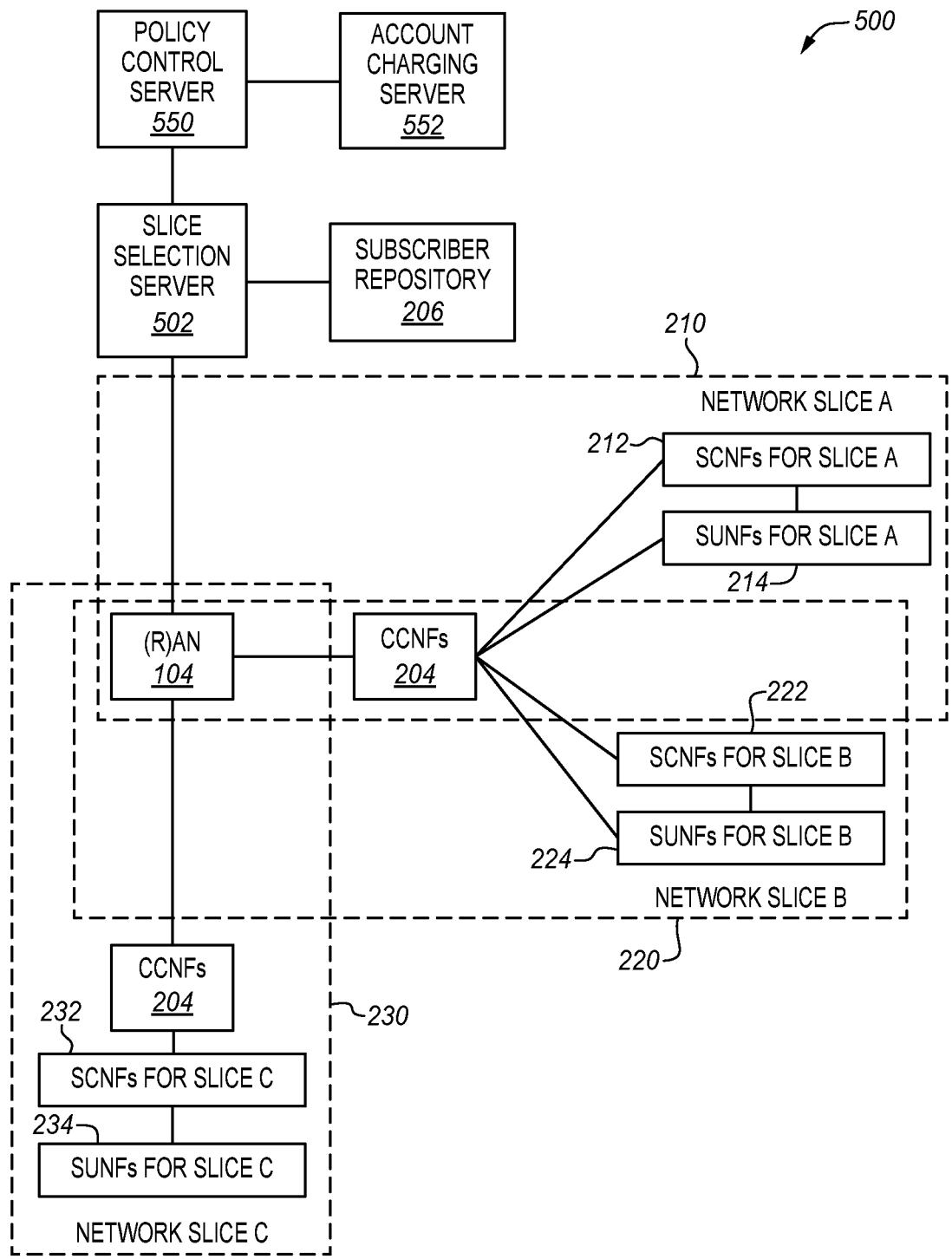
FIG. 5 illustrates a network slicing architecture in an exemplary embodiment.

FIG. 5 illustrates a network slicing architecture 500 in an exemplary embodiment. Architecture 500 is a system or network that is partitioned into multiple network slices, and slice-specific network functions are allocated to each network slice. Some elements of architecture 500 are similar to the elements of architecture 200 shown in FIG. 2. In this embodiment, architecture 500 includes a slice selection server 502, a policy control server 550, and an account charging server 552. Slice selection server 502 is configured to communicate with policy control server 550 and/or account charging server 552 when selecting a network slice or NSI for a UE. Although shown as a separate element, policy control server 550 may be implemented within slice selection server 502 in another embodiment.

Figure 6:
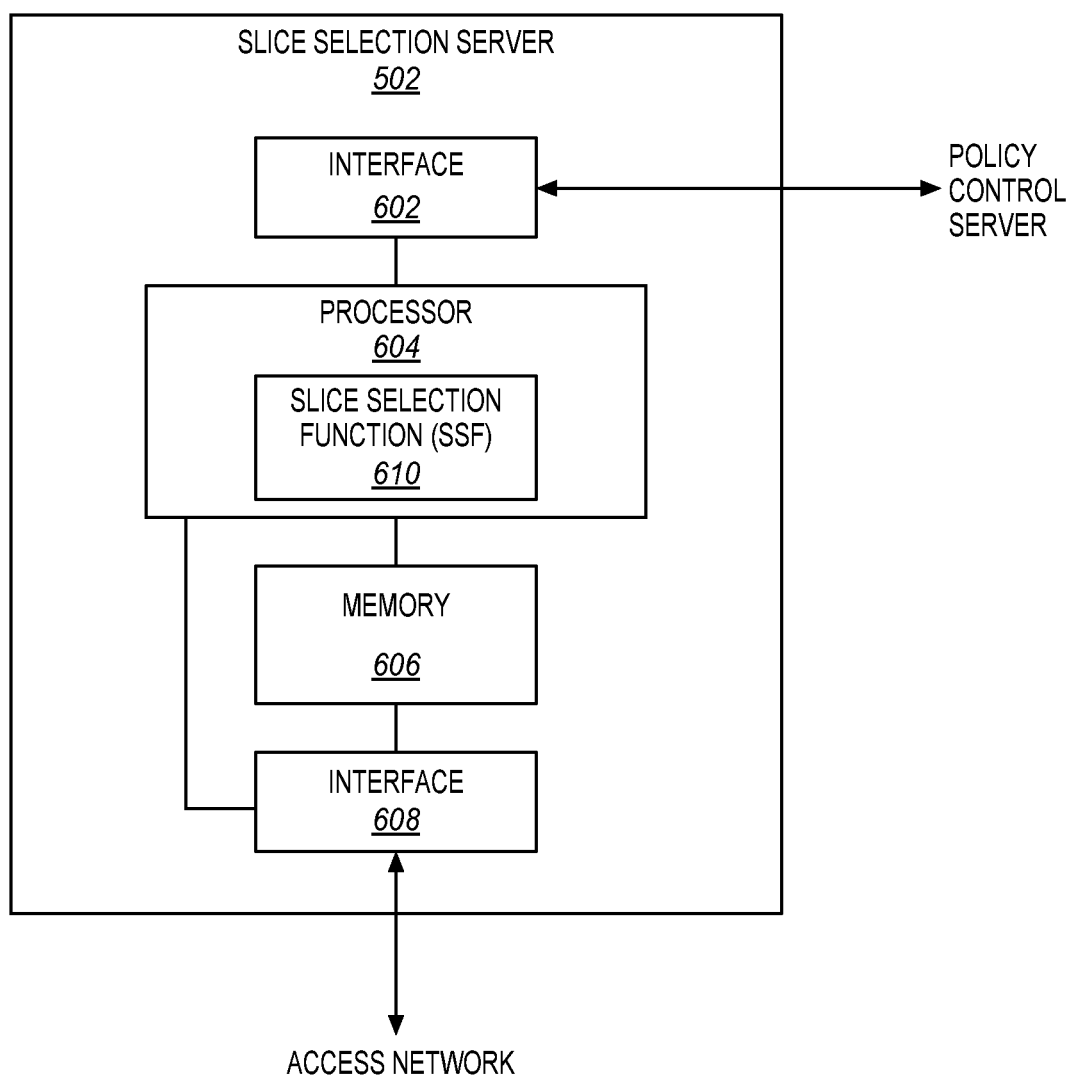
FIG. 6 is a block diagram of a slice selection server in an exemplary embodiment.

FIG. 6 is a block diagram of slice selection server 502 in an exemplary embodiment. Slice selection server 502 is an element of a core network (e.g., core network 102) that is configured to select a network slice or NSI for a UE in response to an attach request from the UE. Slice selection server 502 includes an interface component 602 configured to communicate with policy control server 550, one or more processors 604, a memory 606, and an interface component 608 configured to communicate with access network 104. Interface component 602 may comprise a hardware component or device that exchanges messages with policy control server 550. Processor 604 represents the internal circuitry, logic, hardware, etc., that provides the functions of slice selection server 502. Memory 606 is a computer readable storage medium (e.g., ROM or flash memory) for data, instructions, applications, etc., and is accessible by processor 604. Interface component 608 may comprise a hardware component or device that exchanges messages with an access network 104 via a protocol, such as Non-Access Stratum (NAS) protocol. Slice selection server 502 may include various other components not specifically illustrated in FIG. 6.

Processor 604 implements a Slice Selection Function (SSF) 610 that is configured to select a network slice or NSI for a UE. SSF 610 is enhanced in this embodiment to select a network slice or NSI for a UE based on the charging rules associated with the UE/subscriber. SSF 610 may query policy control server 550 to identify the charging rules associated with the UE. SSF 610 may also consider other information, such as subscription information, UE usage type, service type, UE capabilities, and MDD, in selecting the network slice. SSF 610 may use selection criteria to select a network slice for a UE, which may be stored in memory 606.

Figure 7:
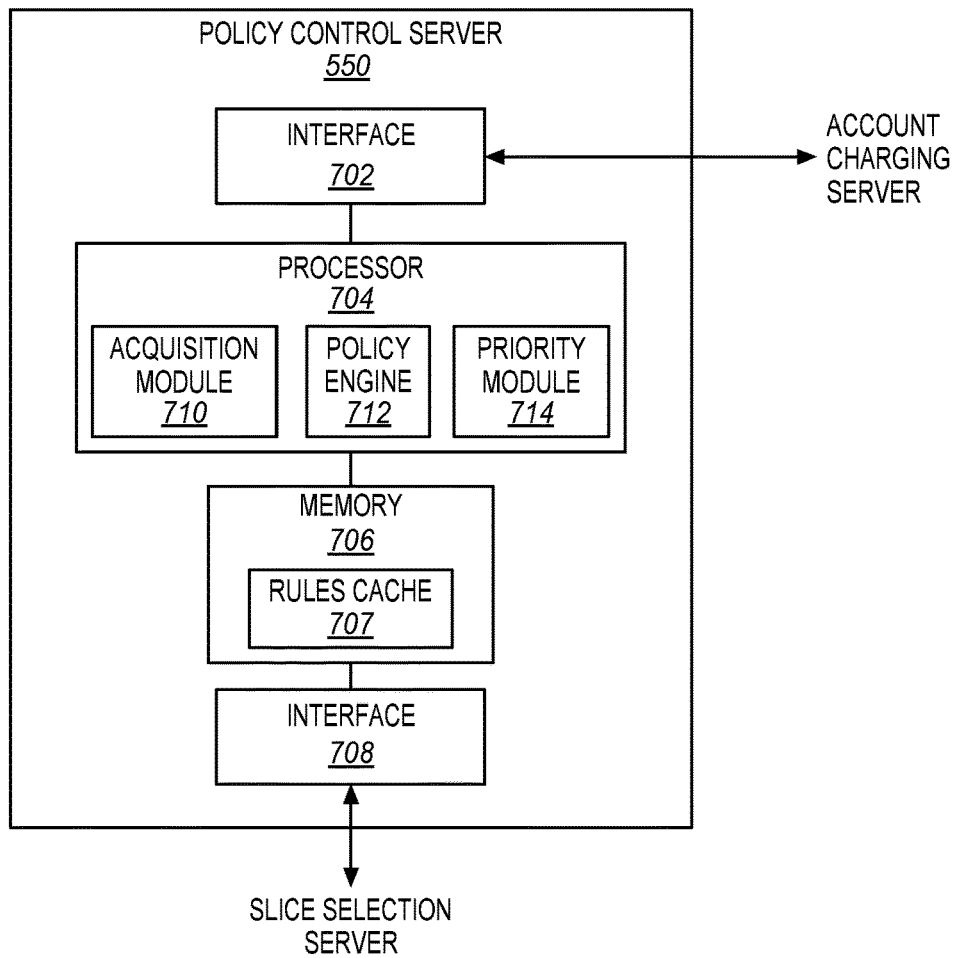
FIG. 7 is a block diagram of a policy control server in an exemplary embodiment.

FIG. 7 is a block diagram of policy control server 550 in an exemplary embodiment. Policy control server 550 is an element of a core network (e.g., core network 102) that identifies a charging policy for a UE, where the charging policy includes a plurality of charging rules. Policy control server 550 includes an interface component 702 configured to communicate with account charging server 552, one or more processors 704, a memory 706, and an interface component 708 configured to communicate with slice selection server 502. Interface component 702 may comprise a hardware component or device that exchanges messages with account charging server 552. Processor 704 represents the internal circuitry, logic, hardware, etc., that provides the functions of policy control server 550. Memory 706 is a computer readable storage medium for data, instructions, applications, etc., and is accessible by processor 704. Memory 706 may provide a rules cache 707 that stores charging rules for a network operator. Interface component 708 may comprise a hardware component or device that exchanges messages with slice selection server 502. Policy control server 550 may include various other components not specifically illustrated in FIG. 7.

Processor 704 implements an acquisition module 710, a policy engine 712, and a priority module 714. Acquisition module 710 is configured to acquire charging rules for a UE from a local rules cache, from account charging server 552, or from another server or database. Acquisition module 710 may also store charging rules acquired from an external server or database in rules cache 707, such as for a configurable time period. Policy engine 712 may store operator-provisioned rules, may acquire subscriber profiles for UEs, and may acquire information on network conditions, such as Key Performance Indicators (PM) related to traffic and bandwidth, QoS, etc. Policy engine 712 is configured process charging rules for a UE, the operator-provisioned rules, the network conditions, etc., to formulate a slice selection policy. Priority module 714 is configured to prioritize charging rules for a UE based on a policy or criteria. For example, the policy used by priority module 714 may consider Time-of-Day (TOD), Day-of-Week (DOW), peak time, off-peak time, network conditions, etc., when prioritizing the charging rules.

Figure 8:
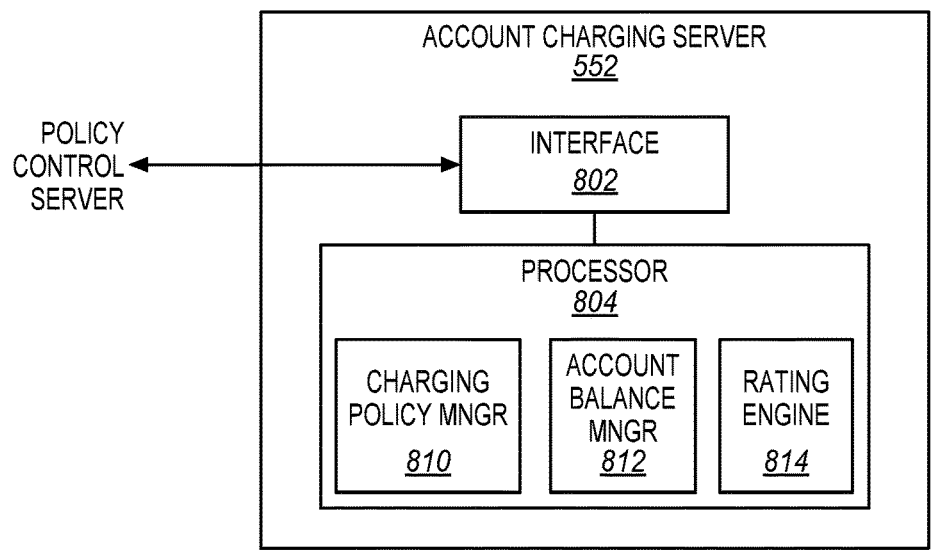
FIG. 8 is a block diagram of an account charging server in an exemplary embodiment.

FIG. 8 is a block diagram of account charging server 552 in an exemplary embodiment. Account charging server 552 is an element of a core network (e.g., core network 102) that provides charging control for the core network. Account charging server 552 may include functionalities of an Online Charging System (OCS) and/or an Offline Charging System (OFCS). In this embodiment, account charging server 552 includes an interface component 802 configured to communicate with policy control server 550, and one or more processors 804. Interface component 802 may comprise a hardware component or device that exchanges messages with policy control server 550. Processor 804 represents the internal circuitry, logic, hardware, etc., that provides the functions of account charging server 552. Account charging server 552 may include various other components not specifically illustrated in FIG. 8.

Processor 804 implements a charging policy manager 810, an account balance manager 812, and a rating engine 814. Charging policy manager 810 is configured to determine or identify a charging policy for a UE. The UE may have multiple service plans associated with different network slices. The different network slices may be at different service tiers or price points. For example, one service plan of the UE may be associated with network slice A (or the type of network slice A), another service plan of the UE may be associated with network slice B (or the type of network slice B), and another service plan of the UE may be associated with network slice C (or the type of network slice C). Charging policy manager 810 is able to determine or identify charging rules that are mapped to each network slice authorized for the UE based on its subscription. The charging rules may have a variety of parameters, such as Quality of Service (QoS), a rate or tariff, a consumed quota for the UE, usage during a billing cycle for the UE, temporal details of a billing cycle for the UE, whether the UE is located within the network or in a partner network, whether smart charging is active, whether the subscriber has opted for spending limits, etc. Charging policy manager 810 may also assign a validity timer to the charging rules.

Account balance manager 812 is configured to control or maintain one or more accounts for a UE. One account may comprise an online or prepaid account that is maintained or updated by account balance manager 812. Another account may comprise an offline or postpaid account, where account balance manager 812 monitors usage of a UE during a billing cycle (e.g., a month). Account balance manager 812 is configured to determine a present account balance a UE, a remaining quota for a UE, present usage during a billing cycle, temporal details of a billing cycle (e.g., time remaining in a billing cycle or time spent during a billing cycle), spend limits defined by a subscriber, or other account information related to the UE.

Rating engine 814 is configured to determine a rate or tariff for network resource usage by a UE. The rate or tariff (also referred as rate plan) may comprise a static tariff or a dynamic tariff. For example, a static tariff may indicate a cost/price for a service based on a service plan. A dynamic tariff may depend on usage, service types, etc. Rating engine 814 may receive information for chargeable events in the form of credit requests (e.g., Credit Control Requests (CCR)), accounting requests (e.g., Accounting Requests (ACR)), Charging Data Records (CDRs), which describe the usage of a UE and/or a service description. Rating engine 814 may then calculate the cost/price of the chargeable event as per the tariff, and store the rated event for billing purposes or send the rated event to an external system for billing. In the case of online charging, account balance manager 812 may decrement the account of the UE based on the tariff determined for a chargeable event. Rating engine 814 is also configured to determine a rate or tariff for each network slice authorized for the UE. When the UE is authorized for different network slices, the rate or tariff applicable to each network slice may be different. For example, a network slice configured for low-latency and high QoS may have a higher tariff than another network slice configured for low QoS.

In this embodiment, policy control server 550 and account charging server 552 are used to support slice selection server 502 in selecting a network slice for a UE. Slice selection server 502 will consult with policy control server 550 and account charging server 552 for additional data (e.g., charging rules) when it receives an attach request from a UE. Thus, slice selection server 502 will have more information to use in selecting a network slice for a UE.

Figure 9:
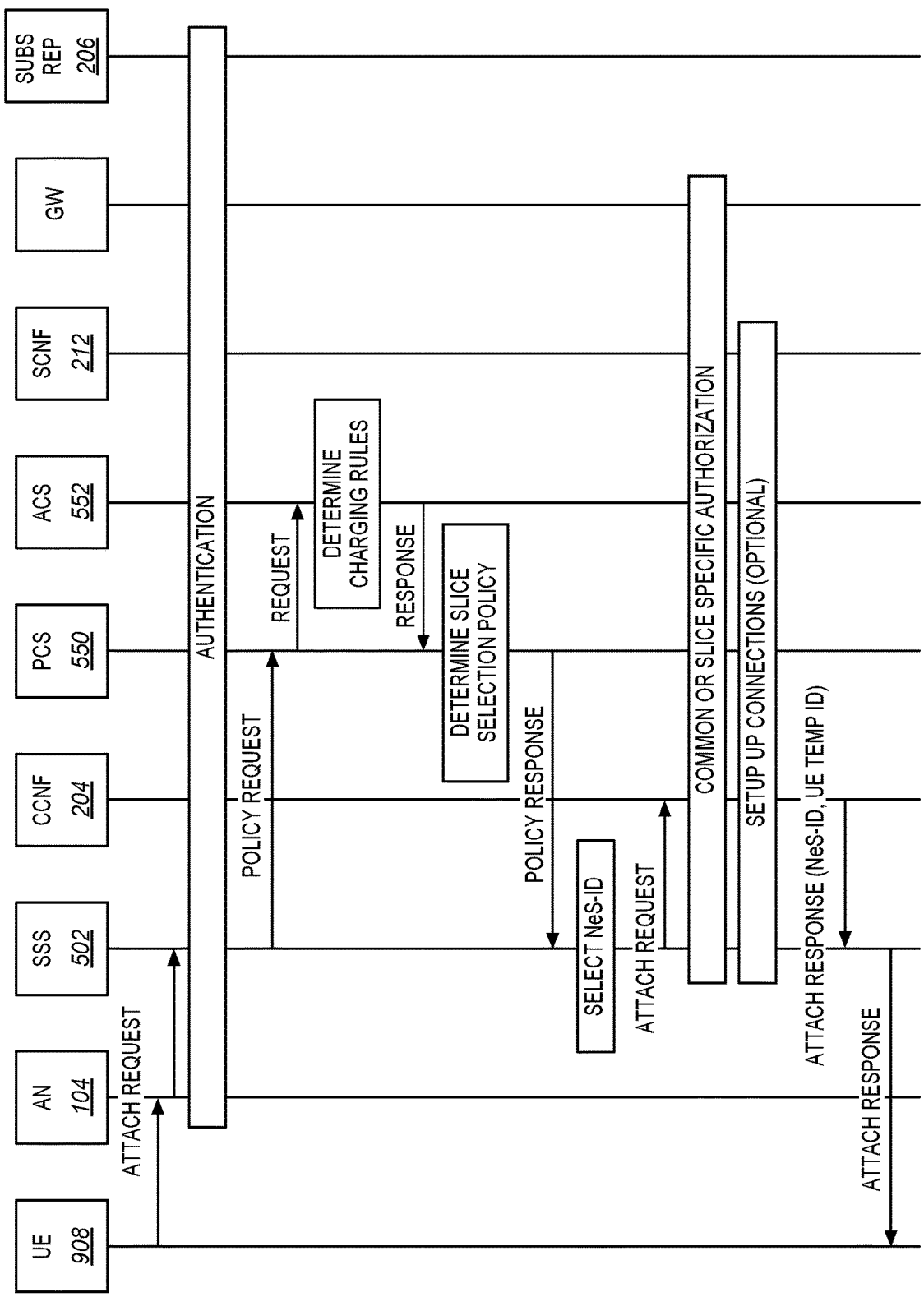
FIG. 9 illustrates an attach procedure for a UE in an exemplary embodiment.

FIG. 9 illustrates an attach procedure for a UE 908 in an exemplary embodiment. When UE 908 attaches to the network, UE 908 sends an attach request to access network (AN) 104 including UE capability and the requested service (optional). Access network 104 forwards the attach request to slice selection server (SSS) 502. In response to the attach request, slice selection server 502 may access subscriber repository 206 to obtain a subscriber profile for UE 908. According to this embodiment, slice selection server 502 is enhanced to acquire additional information for selecting a network slice for UE 908. Thus, slice selection server 502 sends a policy request to policy control server (PCS) 550, in response to receiving the attach request, to acquire a slice selection policy for UE 908. Policy control server 550 sends a request to account charging server (ACS) 552 for a charging policy for UE 908. In response to the request, account charging server 552 determines, acquires, or otherwise identifies the charging policy for UE 908. For the charging policy, account charging server 552 may determine a plurality of charging rules for UE 908, where the charging rules are mapped to different network slices authorized for UE 908. Account charging server 552 sends a response to policy control server 550 with the charging rules for UE 908. Policy control server 550 determines the slice selection policy based on the charging rules, and sends a policy response to slice selection server 502 indicating the slice selection policy.

Slice selection server 502 selects the appropriate network slice for UE 908 based, at least in part, on the charging rules for UE 908. Signaling may continue much as described in FIG. 3, where an attach response is provided to UE 908 with a network slice ID (e.g., NeS-ID). The attach response may also indicate a charging rule ID for the selected network slice. The charging rule ID indicates a charging rule, and rate for usages and services requested in the attach request.

UE 908 may process the charging rule ID and network slice ID. If UE 908 discovers the charging rule and/or rate do not meet its expectation (assuming the subscriber has multiple service plans with multiple charging rules), UE 908 may re-request a new network slice with the same usage and service type(s). Slice selection server 502 re-evaluates the re-request and may re-consult with policy control server 550 and account charging server 552, or may respond with a dataset stored locally, as it would have information in its cache about the multiple charging rules from the initial consultation. Slice selection server 502 may then select an alternate network slice for UE 908.

Figure 10:
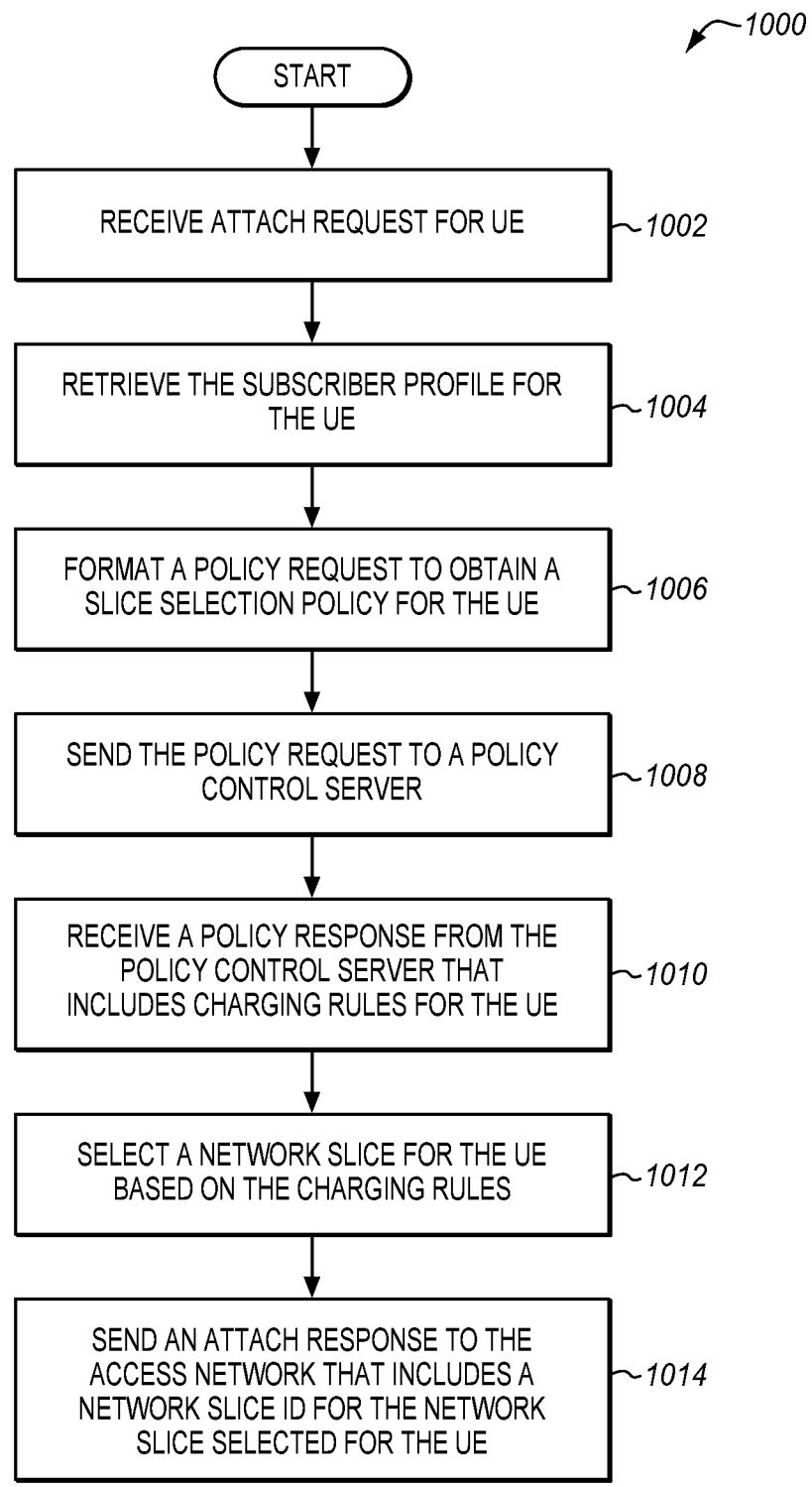
FIGS. 10-12 are flow charts illustrating a method of selecting a network slice in an exemplary embodiment.
Figure 11:
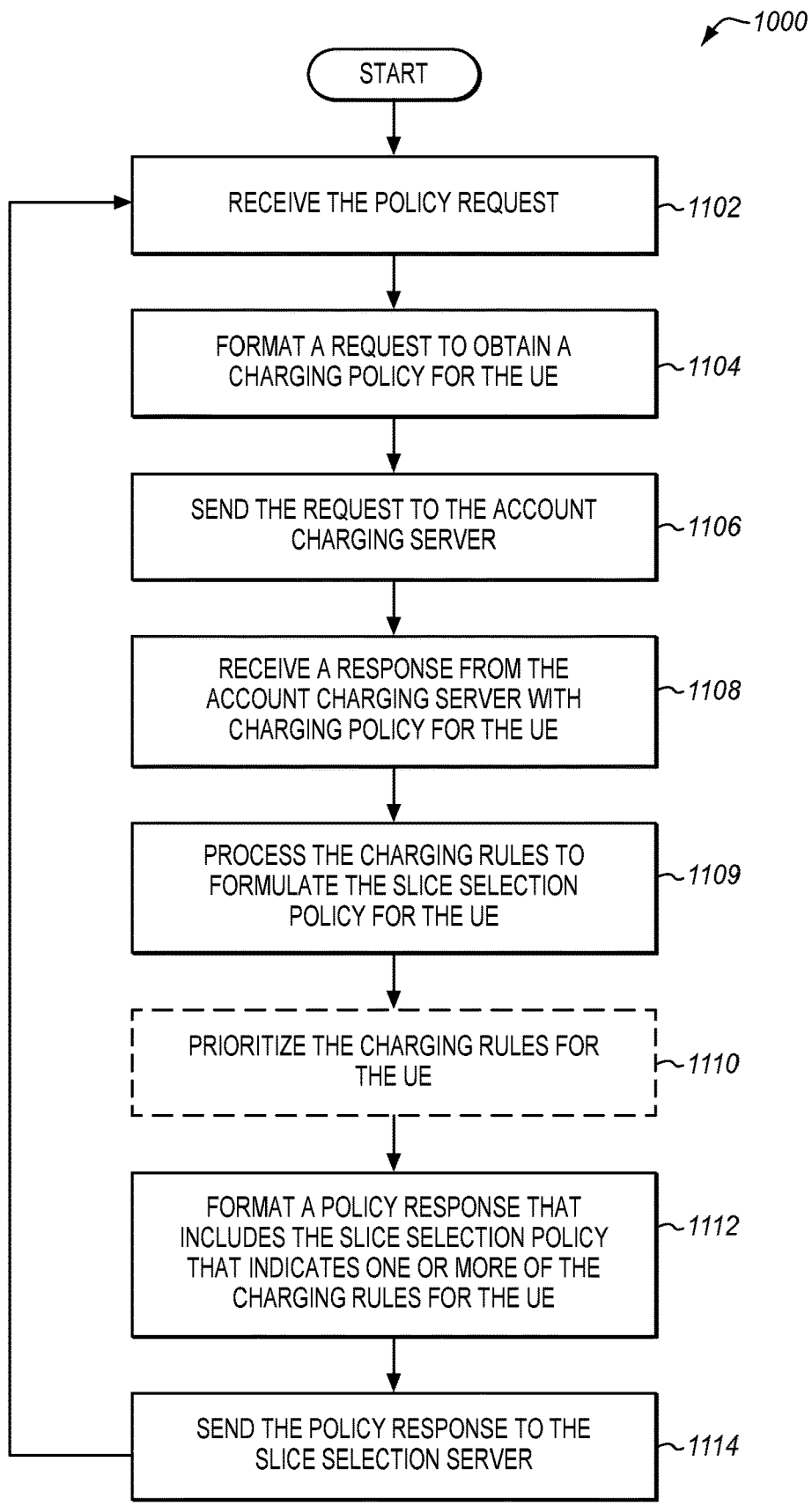
Figure 12:
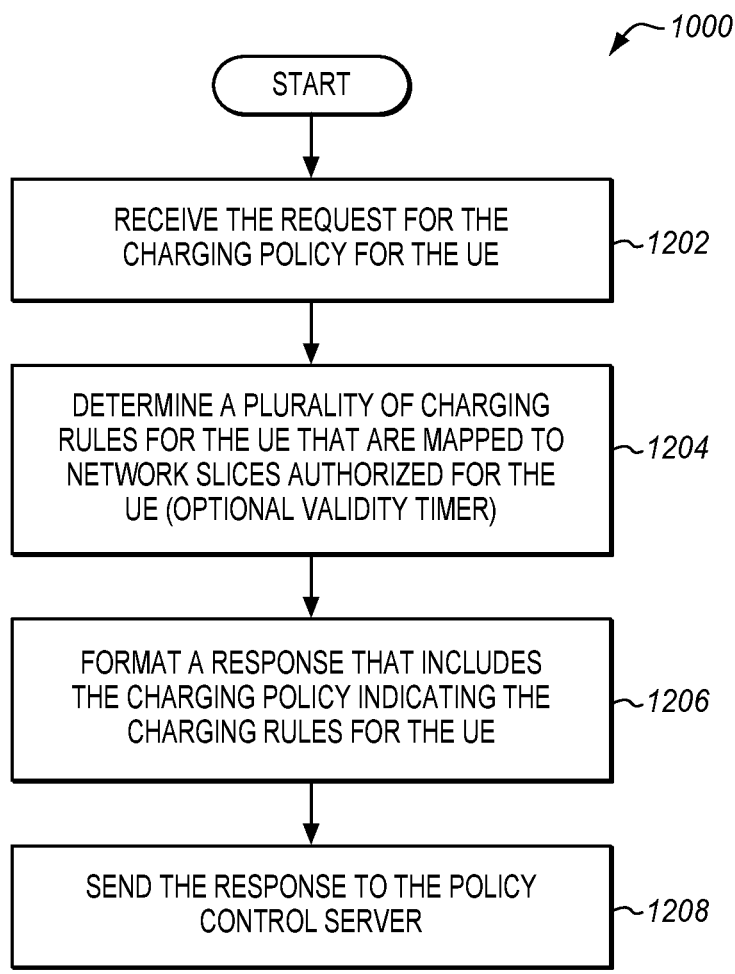

Further details of selecting a network slice for UE 908 is described in FIGS. 10-12. FIGS. 10-12 are flow charts illustrating a method 1000 of selecting a network slice in an exemplary embodiment. The steps of method 1000 will be described with reference to architecture 500 in FIG. 5, but those skilled in the art will appreciate that method 1000 may be performed in other architectures. Also, the steps of the flow charts described herein are not all inclusive and may include other steps not shown, and the steps may be performed in an alternative order.

In FIG. 10, interface component 608 (see also, FIG. 6) of slice selection server 502 receives the attach request for UE 908 from access network 104 (step 1002). In response to the attach request, SSF 610 initiates a selection procedure for selecting a network slice for UE 908. For the selection procedure, SSF 610 may retrieve the subscriber profile for UE 908 from subscriber repository 206 (step 1004), and extract information from the attach request. SSF 610 is also programmed to retrieve or obtain a slice selection policy for UE 908 from policy control server 550. Thus, SSF 610 formats a policy request to obtain the slice selection policy for UE 908 (step 1006), and sends the policy request to policy control server 550 through interface component 602 (step 1008).

In FIG. 11, policy control server 550 (see also, FIG. 7) receives the policy request from SSF 610 through interface component 708 (step 1102). The policy request received by interface component 708 may include subscriber data, service types, or other data received from UE 908 or identified in the subscriber profile associated with UE 908. In response to the policy request, acquisition module 710 in policy control server 550 formats a request to obtain a charging policy for UE 908 (step 1104), and sends the request to account charging server 552 through interface component 702 (step 1106).

In FIG. 12, interface component 802 (see also, FIG. 8) of account charging server 552 receives the request from policy control server 550 (step 1202). In response to the request, charging policy manager 810 determines or identifies a plurality of charging rules for UE 908 (step 1204) that make up the charging policy for UE 908. As stated above, the subscription of UE 908 has a service plan or multiple services plans that are associated with different network slices or even different network slice types. Thus, UE 908 is authorized to access services provided by different network slices. Charging policy manager 810 determines or identifies charging rules that are mapped to each network slice authorized for UE 908. In other words, for each network slice authorized for UE 908, a charging rule is mapped to that network slice. Charging policy manager 810 may also identify or assign a validity timer to the charging rules for each network slice.

The charging rules may have parameters that are pre-populated based on the service plan, such as a Quality of Service (QoS) allocated to UE 908, a charging method (offline/online), whether smart charging is activated, spending limits, etc. The charging rules may have parameters that are dynamically populated by charging policy manager 810. For example, a charging rule may have one or more parameters regarding an account associated with UE 908. Charging policy manager 810 may query account balance manager 812 for information on the subscriber's account. Account balance manager 812 may identify a consumed quota of an online account, present usage for UE 908 during a billing cycle, temporal details of a billing cycle (e.g., time remaining in a billing cycle or time spent during a billing cycle), etc., and reply back to charging policy manager 810. Charging policy manager 810 may query rating engine 814 for a rate or tariff applicable to a network slice. Rating engine 814 may determine a rate, tariff, or rating group for different network slices, validity timers for the tariffs, etc., and reply back to charging policy manager 810. The rate may be statically-defined for the network slice, or may be a dynamic rate based on conditions, such as TOD, DOW, peak/off-peak, network conditions, etc. Charging policy manager 810 formats a response that includes the charging policy for UE 908 indicating the charging rules for UE 908 that are mapped to a network slice (step 1206). In formatting the response, charging policy manager 810 may populate (i.e., insert data into) parameters of the charging rules based on information acquired from account balance manager 812 and rating engine 814, such as by inserting information regarding an account associated with UE 908, a tariff for a network slice mapped to a charging rule, etc. Charging policy manager 810 may also populate a parameter of the charging rules with their associated validity timer. Charging policy manager 810 then sends the response to policy control server 550 through interface component 802 (step 1208).

In FIG. 11, acquisition module 710 (see also, FIG. 7) receives the response from account charging server 552 through interface component 702 (step 1108) that includes the charging rules for the charging policy of UE 908. Acquisition module 710 may store the charging rules from the response in rules cache 707. Acquisition module 710 may also acquire network information, such as KPIs related to traffic, bandwidth, QoS, etc. Rules engine 712 may then process the charging rules to formulate the slice selection policy for UE 908 (step 1109). For instance, rules engine 712 may process operator-provisioned rules and the subscriber profile associated with UE 908 to modify the charging rules provided by account charging server 552 if needed. For example, rules engine 712 may add data to one or more parameters of the charging rules as needed. Rules engine 712 may also modify one or more parameters of the charging rules based on the operator-provisioned rules, the subscriber profile, etc. Rules engine 712 may add one or more charging rules for UE 908, or delete one or more of the charging rules provided by account charging server 552 based on the operator-provisioned rules, subscriber profile, etc. Priority module 714 may optionally prioritize the charging rules for UE 908 (step 1110) based on a policy or criteria. For example, the policy used by priority module 714 may consider TOD, DOW, peak/off-peak time, network conditions, etc. Priority module 714 may also insert an indication of the priority in a parameter of the charging rules. Rules engine 712 then formats a policy response that includes the slice selection policy for UE 908, where the slice selection policy indicates one or more of the charging rules for UE 908 that are mapped to a network slice (step 1112). Rules engine 712 then sends the policy response to slice selection server 502 through interface component 708 (step 1114).

In FIG. 10, interface component 602 (see also, FIG. 6) of slice selection server 502 receives the policy response from policy control server 550 (step 1010) that includes the charging rules (i.e., slice selection policy) for UE 908. SSF 610 then selects a network slice or NSI for UE 908 based on the charging rules (step 1012) and selection criteria. The network slice may be a core network part (e.g., NFs in the core network), or a core network part and a RAN part. SSF 610 may select the network slice or NSI for UE 908 based on other information provided by UE 908 or in the subscriber profile associated with UE 908. SSF 610 then sends an attach response to access network 104 that includes a network slice ID for the network slice selected for UE 908 (step 1014). The network slice ID may comprise a NeS-ID that indicates a CCNF ID or type of CCNF, and indicates one or more SCNFs or type of SCNFs. SSF 610 may also insert a charging rule ID in the attach response for the charging rule mapped to the network slice selected for UE 908. SSF 610 may insert the charging rule ID in the attach response separately from the network slice ID, or SSF 610 may embed the charging rule ID into the network slice ID. Access network 104 will then forward the attach response with the network slice ID to UE 908 so that UE 908 is aware of the network slice that was selected during the attach procedure.

UE 908 may process the charging rule ID and network slice ID. If UE 908 discovers the charging rule and/or rate do not meet its expectation (assuming the subscriber has multiple service plans with multiple charging rules), UE 908 can re-request a new network slice with the same usage and service type(s). To do so, UE 908 may send another attach request to access network 104 with the network slice ID and the charging rule ID previously selected by SSF 610. In response to the other attach request, SSF 610 may re-consult with policy control server 550 and account charging server 552, or may identify the charging rules for UE 908 that are stored locally in memory 606. SSF 610 selects an alternate network slice or NSI for UE 908 based on the charging rules (step 1012) and alternate selection criteria. SSF 610 then sends another attach response to access network 104 that includes a network slice ID for the alternate network slice selected for UE 908 (step 1014). SSF 610 may also insert a charging rule ID in the other attach response for the charging rule mapped to the alternate network slice selected for UE 908.

SSF 610 provides a technical benefit in that it is able to select an appropriate network slice for UE 908 based on charging rules for UE 908. SSF 610 not only considers the slice-specific network functions that meets service needs of UE 908, but considers charging applicable to UE 908. For example, SSF 610 may select a network slice that has a low or no-charge tariff for UE 908 when the network functions of that network slice still meet the service needs of UE 908. Thus, UE 908 will be charged less for usage of that network slice as compared to other network slices, which will cause the subscriber to be more satisfied with his/her service.

Figure 13:
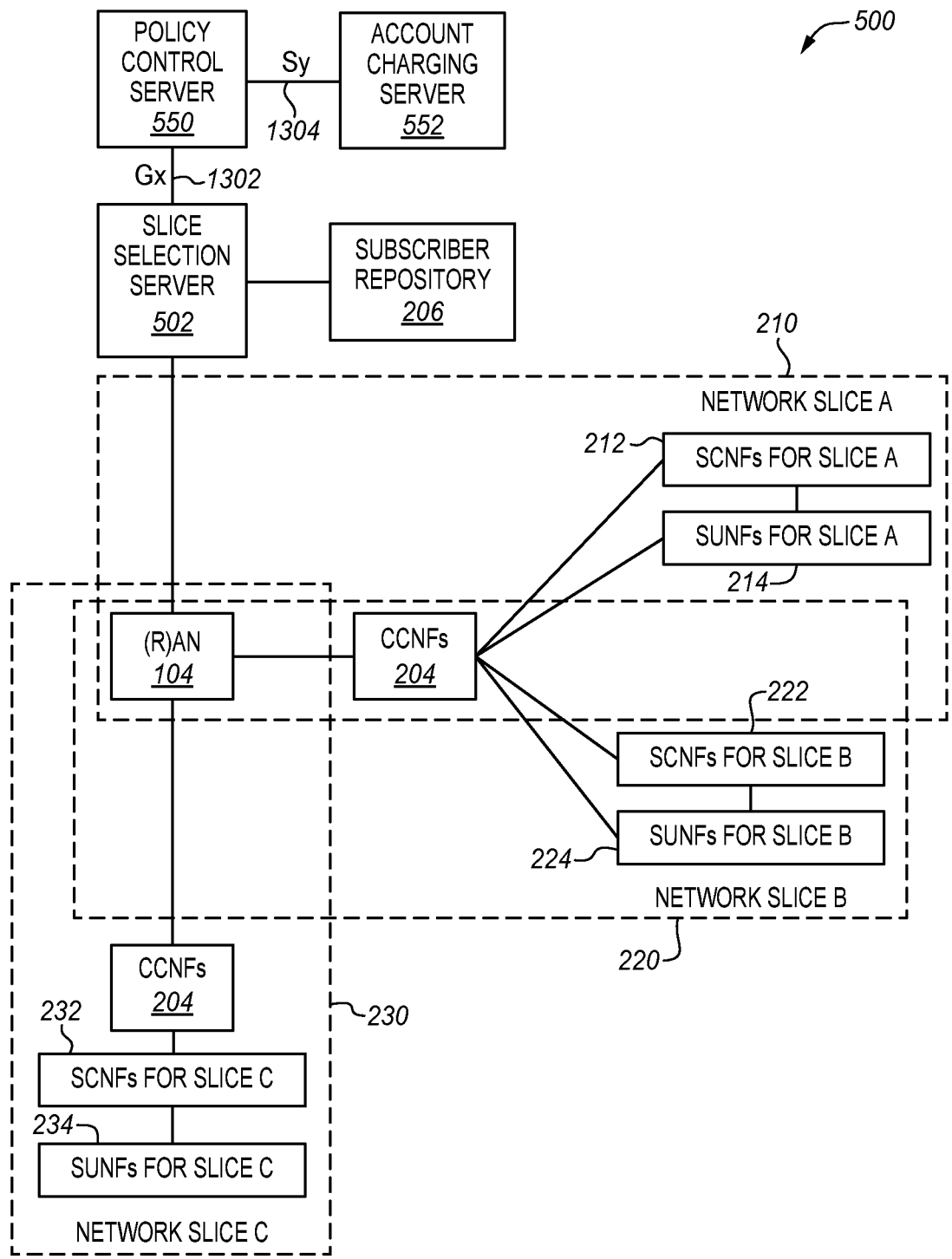
FIG. 13 illustrates the interfaces of a network slicing architecture in an exemplary embodiment.

In another embodiment, the interfaces or reference points between slice selection server 502, policy control server 550, and account charging server 552 are enhanced to support network slicing. FIG. 13 illustrates the interfaces of network slicing architecture 500 in an exemplary embodiment. In this embodiment, the interface 1302 or reference point implemented between slice selection server 502 and policy control server 550 is a Gx interface (see 3GPP TS 29.212 (version 14.3.0)), and the interface 1304 or reference point implemented between policy control server 550 and account charging server 552 is an Sy interface (see 3GPP TS 29.219 (version 14.1.0)). The Gx and Sy interfaces use Diameter messages in request/response transactions. The Diameter messages from slice selection server 502 to policy control server 550 via Gx, and from policy control server 550 to account charging server 552 via Sy should address needs of slicing usage and service types from UE 908 and access network 104. The Diameter messages from account charging server 552 to policy control server 550 via Sy, and from policy control server 550 to slice selection server 502 via Gx should provide charging rules which map to network slices authorized for UE 908. Although the Gx and Sy reference points are discussed herein, the same principles apply to other Diameter-based reference points that may be used in architecture 500.

Figure 14:
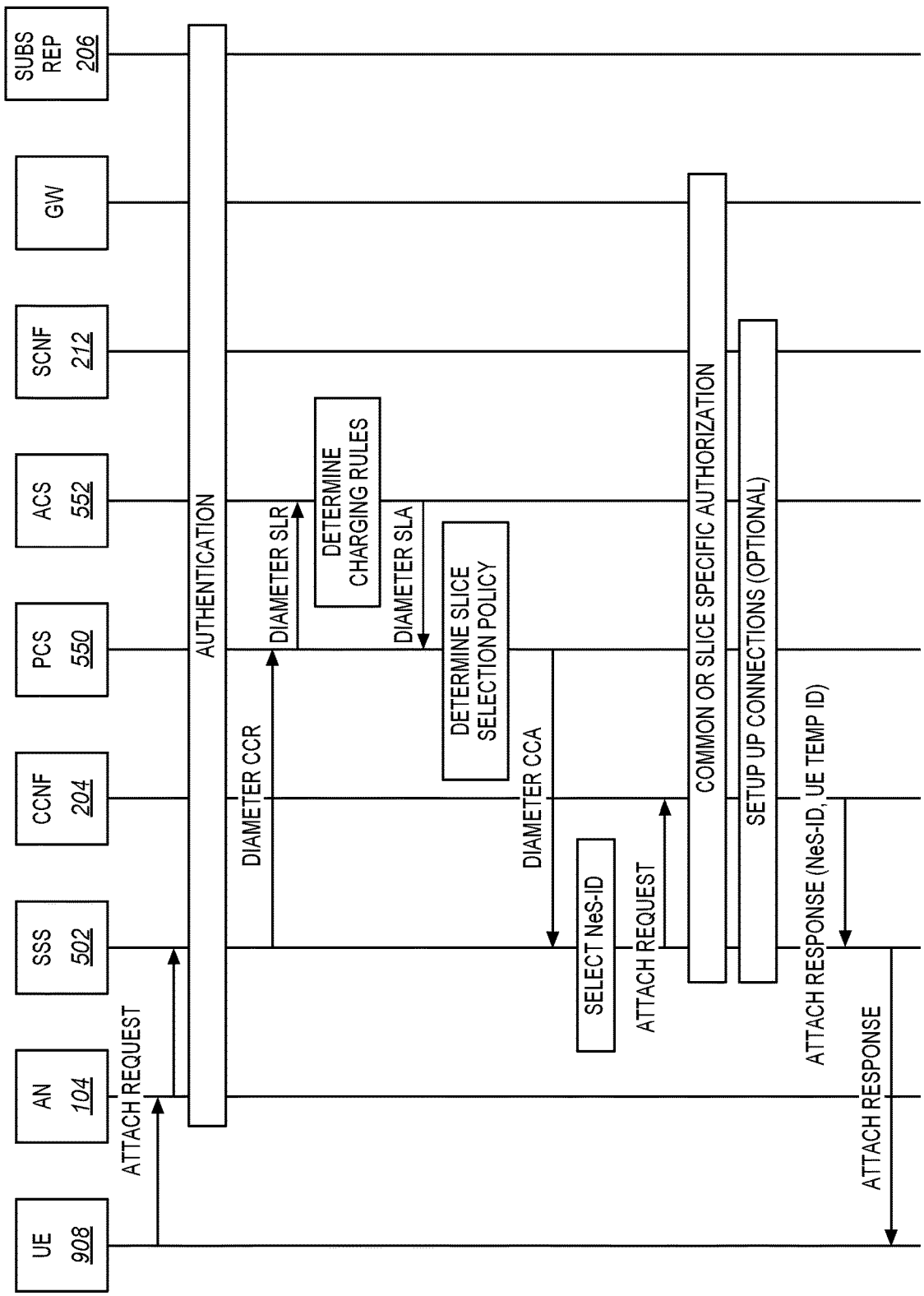
FIG. 14 illustrates an attach procedure for a UE in an exemplary embodiment.

FIG. 14 illustrates an attach procedure for a UE in an exemplary embodiment. The attach procedure is similar to the procedure illustrated in FIG. 9, except that the procedure is shown over the Gx and Sy reference points. As illustrated in FIG. 14, when slice selection server (SSS) 502 receives the attach request for UE 908, it sends a policy request to policy control server (PCS) 550. In this embodiment, the policy request is a Diameter request sent over the Gx interface 1302. The Gx interface 1302 is enhanced in this embodiment to support network slicing. Data delivered by Diameter protocol is in the form of Attribute Value Pairs (AVP). Some of the AVP values are used by the Diameter protocol itself, while other AVPs deliver data associated with particular applications that employ Diameter. In order to support network slicing, the Gx interface 1302 may be extended so that the Diameter request sent from slice selection server 502 to policy control server 550 includes one or more new AVPs. A new AVP may be defined for a network slice ID, and a new AVP may be defined for network slice information. The AVP for the network slice ID may be used by slice selection server 502 to indicate, deliver, or identify one or more network slices that are authorized for UE 908 (e.g., as in the subscriber profile), or a network slice that was previously selected for UE 908. The AVP for the network slice information may be used by slice selection server 502 to indicate, deliver, or identify the service category or sub-category associated with a network slice, or other information that supports network slicing. For example, a network slice may belong to one of the following categories: (1) Enhanced Mobile BroadBand (eMBB), which supports services for high bandwidth requirements such as high-definition video, virtual reality, and augmented reality; (2) Ultra-Reliable Low-Latency Communication (uRLLC), which supports latency-sensitive services such as automated driving; and (3) Massive Machine-Type Communications (mMTC), which supports high connection density, such as a smart city.

In one embodiment, the Gx interface 1302 may use a Diameter Credit Control Request (CCR) as the policy request sent from slice selection server 502 to policy control server 550. The following describes a Diameter CCR that is extended with new AVPs of "NeS-ID" and "NS-Information":

```
<CC-Request> ::= < Diameter Header: 272, REQ, PXY >
    < Session-Id >
    { Auth-Application-Id }
    { Origin-Host }
    { Origin-Realm }
    { Destination-Realm }
    { CC-Request-Type }
    { CC-Request-Number }
    [ Destination-Host ]
    [ Origin-State-Id ]
    *[ Subscription-Id ]
    [ Framed-IP-Address ]
    [ Framed-IPv6-Prefix ]
    [ 3GPP-RAT-Type ]
    [ Termination-Cause ]
    [ User-Equipment-Info ]
    [ 3GPP-GPRS-Negotiated-QoS-Profile ]
    [ 3GPP-SGSN-MCC-MNC ]
    [ 3GPP-SGSN-Address ]
    [ 3GPP-SGSN-IPv6-Address ]
    [ Called-Station-ID ]
    [ Bearer-Usage ]
    [ PDP-Session-Operation ]
    *[ NeS-ID ] +++
    *[ NS-Information ] +++
    *[ TFT-Packet-Filter-Information ]
    *[ Proxy-Info ]
    *[ Route-Record ]
    *[ AVP]
```

A "*" indicates that the AVP may occur multiple times. A "+++" indicates an AVP that is newly-defined to support network slicing. The "NeS-ID" AVP is defined to indicate, deliver, or identify a network slice ID or NeS-ID for a network slice. The "NeS-ID" AVP is optional because slice selection server 502 may not have a NeS-ID available before sending the Diameter CCR to policy control server 550. The "NS-Information" AVP is defined to indicate, deliver, or identify network slicing support information. This information may be gleaned from the attach intent of UE 908. For example, if the attach request is for a specific usage segment, then an initial view of the QoS requirement may be assessed at slice selection server 502. The NS-Information may contain a category indication for the service, such as eMMB, uRLLC, or mMTC, and may be extended as further categories evolve, or as these major categories are subdivided into sub-categories. The following describes an example of an "NS-Information" AVP:

```
NS-Information :: =   < AVP Header: xxx>
    [ 3GPP-Charging-Id ]
        [ PDN-Connection-Charging-ID ]
    * [ Access-Network-Information ]
        [ Cellular-Network-Information ]
            [ Node-Id ]
        [ 3GPP-PDP-Type ]
    * [ PDP-Address ]
        [ PDP-Address-Prefix-Length ]
```

-continued

```
[ Dynamic-Address-Flag ]
[ Dynamic-Address-Flag-Extension ]
[ QoS-Information ]
* [ SGSN-Address ]
* [ GGSN-Address ]
      * [ TDF-IP-Address ]
* [ SGW-Address ]
* [ ePDG-Address ]
* [ TWAG-Address ]
[ CG-Address ]
[ Serving-Node-Type ]
[ SGW-Change ]
[ 3GPP-IMSI-MCC-MNC ]
[ IMSI-Unauthenticated-Flag ]
[ 3GPP-GGSN-MCC-MNC ]
[ 3GPP-NSAPI ]
[ Called-Station-Id ]
[ 3GPP-Session-Stop-Indicator ]
[ 3GPP-Selection-Mode ]
[ 3GPP-Charging-Characteristics ]
[ Charging-Characteristics-Selection-Mode ]
[ 3GPP-SGSN-MCC-MNC ]
[ 3GPP-MS-TimeZone ]
[ Charging-Rule-Base-Name ]
[ ADC-Rule-Base-Name ]
[ 3GPP-User-Location-Info ]
[ User-Location-Info-Time ]
[ User-CSG-Information ]
[ Presence-Reporting-Area-Information ]
[ 3GPP2-BSID ]
[ TWAN-User-Location-Info ]
[ UWAN-User-Location-Info ]
[ 3GPP-RAT-Type ]
[ PS-Furnish-Charging-Information ]
[ PDP-Context-Type ]
[ Offline-Charging ]
* [ Traffic-Data-Volumes ]
* [ Service-Data-Container ]
      [ User-Equipment-Info ]
      [ Terminal-Information ]
      [ Start-Time ]
      [ Stop-Time ]
      [ Change-Condition ]
      [ Diagnostics ]
[ Low-Priority-Indicator ]
[ NBIFOM-Mode ]
[ NBIFOM-Support ]
[ MME-Number-for-MT-SMS ]
[ MME-Name ]
[ MME-Realm ]
[ Logical-Access-ID ]
[ Physical-Access-ID ]
[ Fixed-User-Location-Info ]
[ CN-Operator-Selection-Entity ]
[ Enhanced-Diagnostics ]
[ SGi-PtP-Tunnelling-Method ]
[ CP-CIoT-EPS-Optimisation-Indicator ]
[ UNI-PDU-CP-Only-Flag ]
[ Serving-PLMN-Rate-Control ]
[ APN-Rate-Control ]
   [ Charging-Per-IP-CAN-Session-Indicator ]
[ RRC-Cause-Counter ]
   * [ NeS-ID ] +++
   * [ NeS-Svc-Category ] +++
   * [ NeS-Svc-Subcategory ] +++
```

The "NeS-ID" AVP is defined to indicate, deliver, or identify a network slice ID or NeS-ID for a network slice. The "NeS-Svc-Category" AVP is defined to indicate, deliver, or identify a value indicating a category for the network slice indicated by the NeS-ID, such as eMMB, uRLLC, mMTC, or another defined category. The "NeS-Svc-Subcategory" AVP is defined to indicate, deliver, or identify a value indicating a subcategory for the network slice indicated by the NeS-ID, such as a subcategory for any of eMMB, uRLLC, and mMTC.

Slice selection server 502, such as through SSF 610, is configured to format the Diameter CCR to populate these new AVPs if necessary (see step 1006 of FIG. 10). For example, slice selection server 502 may identify a NeS-ID for a network slice that is authorized for UE 908 or previously selected for UE 908, and populate the "NeS-ID" AVP in the CCR and/or populate the "NeS-ID" AVP in the "NS-Information" AVP with the NeS-ID. Further, slice selection server 502 may identify a category or sub-category for the network slice indicated by the NeS-ID, and populate the "NeS-Svc-Category" AVP and/or the "NeS-Svc-Subcategory" AVP appropriately. Slice selection server 502 may populate other AVPs of the CCR and the "NS-Information" AVP as needed.

In FIG. 14, when policy control server (PCS) 550 receives the policy request (e.g., Diameter CCR) from slice selection server (SSS) 502, it sends a request to account charging server (ACS) 552 for a charging policy for UE 908. In this embodiment, the request for the charging policy is a Diameter request sent over the Sy interface 1304. The Sy interface 1304 is enhanced in this embodiment to support network slicing. In order to support network slicing, the Sy interface 1304 may be extended so that the Diameter request sent from policy control server 550 to account charging server 552 includes one or more new AVPs. A new AVP may be defined for a network slice ID, and a new AVP may be defined for network slice information. The AVP for the network slice ID may be used by policy control server 550 to indicate, deliver, or identify one or more network slices that are authorized for UE 908 (e.g., as indicated in the subscriber profile), or a network slice that was previously selected for UE 908. The AVP for the network slice information may be used by policy control server 550 to indicate, deliver, or identify the service category or sub-category associated with a network slice, along with other information that supports network slicing.

In one embodiment, the Sy interface 1304 may use a Diameter Spending Limit Request (SLR) as the request sent from policy control server 550 to account charging server 552. The following describes a Diameter SLR that is extended with new AVPs of "NeS-ID" and "NS-Information":

```
<SL-Request> ::= <Diameter Header: 8388635, REQ, PXY >
       < Session-Id >
       [ DRMP ]
       { Auth-Application-Id }
       { Origin-Host }
       { Origin-Realm }
       { Destination-Realm }
       [ Destination-Host ]
       [ Origin-State-Id ]
       [ OC-Supported-Features ]
       { SL-Request-Type }
      *[ Subscription-Id ]
      *[ Policy-Counter-Identifier ]
       [ Logical-Access-ID ]
       [ Physical-Access-ID ]
      *[ NeS-ID ] +++
      *[ NS-Information ] +++
      *[ Proxy-Info ]
       *[ Route-Record ]
       *[ AVP ]
```

The "NeS-ID" AVP is defined to indicate, deliver, or identify a network slice ID or NeS-ID for a network slice. The "NeS-ID" AVP is optional because policy control server 550 may not have a NeS-ID available before sending the SLR. The "NS-Information" AVP is defined to indicate, deliver, or identify network slicing support information that is received from slice selection server 502 in the Gx CCR. Policy control server 550, such as through acquisition module 710, is configured to format the Diameter SLR to populate these new AVPs if necessary (see step 1104 of FIG. 11). For example, policy control server 550 may identify the NeS-ID from the Diameter CCR, and populate the "NeS-ID" AVP in the SLR and/or populate the "NeS-ID" AVP in the "NS-Information" AVP with the NeS-ID. Further, policy control server 550 may identify a category or sub-category for the network slice from the Diameter CCR, and populate the "NeS-Svc-Category" AVP and/or the "NeS-Svc-Subcategory" AVP appropriately. Policy control server 550 may populate other AVPs of the SLR and the "NS-Information" AVP as needed based on information from the CCR. Policy control server 550 may modify the "NS-Information" AVP based on temporal details within the billing cycle, granted and consumed quota for the subscriber, and other factors.

In FIG. 14, when account charging server (ACS) 552 receives the request (e.g., Diameter SLR) from policy control server (PCS) 550, it determines a charging policy for UE 908. As part of the charging policy, account charging server 552 determines a plurality of charging rules for UE 908 that are mapped to network slices (see step 1204 of FIG. 12), and sends a response to policy control server 550 indicating the charging rules that are mapped to the network slices (see step 1208 of FIG. 12). In this embodiment, the response is a Diameter response sent over the Sy interface 1304. The Sy interface 1304 may be extended so that the Diameter response sent from account charging server 552 to policy control server 550 includes one or more new AVPs. A new AVP may be defined for a network slice ID, a new AVP may be defined for a charging rule ID, and a new AVP may be defined for a validity timer for the charging rule.

In one embodiment, the Sy interface 1304 may use a Diameter Spending Limit Answer (SLA) as the response sent from account charging server 552 to policy control server 550. The following describes a Diameter SLA that is extended with new AVPs of "NeS-ID", "NeS-Charging-Rule-Name", and "NeS-Timer":

```
<SL-Answer> ::= < Diameter Header: 8388635, PXY >
    < Session-Id >
    [ DRMP ]
    { Auth-Application-Id }
    { Origin-Host }
    { Origin-Realm }
    [ Result-Code ]
    [ Experimental-Result ]
    [ OC-Supported-Features ]
    [ OC-OLR ]
    *[ Policy-Counter-Status-Report ]
    [ Error-Message ]
    [ Error-Reporting-Host ]
    [ Failed-AVP ]
    [ Origin-State-Id ]
    *[ Redirect-Host ]
    [ Redirect-Host-Usage ]
    [ Redirect-Max-Cache-Time ]
    *[ NeS-ID ] +++
    *[ NeS-Timer ] +++
    *[ NeS-Charging-Rule-Name ] +++
    [ Service-Identifier ] %%%
    [ Rating-Group ] %%%
    *[ Flow-Description ]
    [ Reporting-Level ]
    [ Online ] %%%
    [ Offline ] %%%
    [ Metering-Method ] %%%
    [ AF-Charging-Identifier ] %%%
    *[ Proxy-Info ]
    *[ Load ]
    *[ AVP ]
```

A "*" indicates an AVP that may occur multiple times. A "+++" indicates an AVP that is newly-defined to support network slicing. A "%%%" indicates an existing AVP that is re-used to support network slicing. The "NeS-ID" AVP is defined to indicate, deliver, or identify a network slice ID or NeS-ID for a network slice. The "NeS-Charging-Rule-Name" AVP is defined to indicate, deliver, or identify a charging rule name or other identifier that uniquely identifies a charging rule that is mapped to the network slice indicated by the NeS-ID. The "NeS-Charging-Rule-Name" AVP may also include sub-AVPs that identify the parameters of the charging rule. The "NeS-Timer" AVP is defined to indicate, deliver, or identify a validity timer assigned to the charging rule. The "Service-Identifier" AVP is reused to indicate, deliver, or identify a service or service component mapped to the network slice. The "Rating-Group" AVP is reused to contain an identifier of a rating group or tariff mapped to the network slice. Each network slice subject to the same rating type is part of the same rating group. The "Online" AVP is reused to indicate whether online charging is used for the network slice, and the "Offline" AVP is reused to indicate whether offline charging is used for the network slice. Both online charging and offline charging may apply for the same network slice. The "Metering-Method" AVP is reused to define what parameters are metered for offline charging for the network slice, such as duration, volume, or both. The "AF-Charging-Identifier" AVP is reused to indicate, deliver, or identify an ID for charging correlation for the network slice.

Account charging server 552, such as through charging policy manager 810, is configured to format the Diameter SLA to populate these new AVPs and existing AVPs if necessary (see step 1206 of FIG. 12). For example, account charging server 552 may identify the charging rule mapped to a network slice, populate the "NeS-ID" AVP in the SLA with the NeS-ID, populate the "NeS-Charging-Rule-Name" with an identifier for the charging rule, and populate the "NeS-Timer" with a validity timer assigned to the charging rule. Further, account charging server 552 may populate the other AVPs of the SLA as needed. Account charging server 552 will perform a similar formatting for each charging rule associated with UE 908, as it is assumed that UE 908 is authorized for multiple network slices that are mapped to different charging rules.

In FIG. 14, policy control server (PCS) 550 receives the response (e.g., Diameter SLA) from account charging server (ACS) 552 that indicates the charging rules for UE 908 per network slice. Policy control server 550 runs rules engine 712, which processes charging rules for a UE, the operator-provisioned rules, the network conditions, etc., to formulate a slice selection policy for UE 908 (see step 1109 of FIG. 11). Policy control server 550 then sends a policy response to slice selection server 502 indicating the charging rules that are mapped to the network slices (see step 1114 of FIG. 11).

In this embodiment, the policy response is a Diameter response sent over the Gx interface 1302. The Gx interface 1302 may be extended so that the Diameter response sent from policy control server 550 to slice selection server 502 includes one or more new AVPs. A new AVP may be defined for a network slice ID, and a new AVP may be defined for a validity timer for the charging rule. Also, the "Charging-Rule-Install" AVP is reused to indicate the charging rule for a network slice.

In one embodiment, the Gx interface 1302 may use a Diameter Credit Control Answer (CCA) as the response sent from policy control server 550 to slice selection server 502.

The following describes a Diameter CCA that is extended with new AVPs of "NeS-ID" and "NeS-Timer", which are added to the "Charging-Rule-Definition" AVP of a Diameter CCA that is reused to support network slicing:

```
<CC-Answer> ::= < Diameter Header: 272, PXY >
    < Session-Id >
    { Auth-Application-Id }
    { Origin-Host }
    { Origin-Realm }
    [ Result-Code ]
    [ Experimental-Result ]
    { CC-Request-Type }
    { CC-Request-Number }
    *[ Event-Trigger ]
    [ Origin-State-Id ]
    *[ Charging-Rule-Remove ]
    *[ Charging-Rule-Install ] %%%
    [ Charging-Information ]
    [ Error-Message ]
    [ Error-Reporting-Host ]
    *[ Failed-AVP ]
    *[ Proxy-Info ]
    *[ Route-Record ]
    *[ AVP ]
```

The "Charging-Rule-Install" AVP is enhanced to support network slicing:

```
Charging-Rule-Install :: = < AVP Header: 1001 >
    *[ Charging-Rule-Definition ]
    *[ Charging-Rule-Name ]
    *[ Charging-Rule-Base-Name ]
    *[ AVP ]
```

The "Charging-Rule-Definition" AVP contains charging rules that are mapped to network slices:

```
Charging-Rule-Definition ::= < AVP Header: 1003 >
    { Charging-Rule-Name } %%%
    [ Service-Identifier ]
    [ Rating-Group ] %%%
    *[ Flow-Description ]
    [ Reporting-Level ]
    [ Online ] %%%
    [ Offline ] %%%
    [ Metering-Method ] %%%
    [ Precedence ] %%%
    [ AF-Charging-Identifier ]
    [ NeS-ID ] +++
    [ NeS-Timer ] +++
    *[ Flows ]
    *[ AVP ]
```

The "Charging-Rule-Name" AVP is re-used to indicate, deliver, or identify charging rules that are mapped to network slices. The new "NeS-ID" AVP is added to the "Charging-Rule-Definition" AVP to indicate or identify the network slice that is mapped to the charging rule indicated by the "Charging-Rule-Name" AVP. The new "NeS-Timer" AVP is added to the "Charging-Rule-Definition" AVP to indicate, deliver, or identify a validity timer for the charging rule mapped to the network slice.

Policy control server 550, such as through rules engine 712, is configured to format the Diameter CCA to populate these new AVPs and existing AVPs if necessary (see step 1112 of FIG. 11). For example, policy control server 550 may identify the charging rule mapped to a network slice, populate the "Charging-Rule-Name" AVP in the CCA with an identifier for the charging rule, populate the "NeS-ID" AVP with the NeS-ID, and populate the "NeS-Timer" with a validity timer assigned to the charging rule. Policy control server 550 may populate AVPs in this manner for each charging rule identified for UE 908. Policy control server 550 may populate the other AVPs of the CCA as needed.

Further, policy control server 550 (through priority module 714) may prioritize the charging rules indicated by account charging server 552 based on TOD, DOW, peak/off-peak time, network conditions, etc. Policy control server 550 may populate the "Precedence" AVP of the "Charging-Rule-Definition" AVP with a value indicating the priority of the charging rule mapped to the network slice.

The enhancements to the Gx and Sy reference points as described above provide a technical benefit in that network slicing is supported. As previously defined, the AVPs for Diameter messages exchanged over the Gx and Sy reference points did not support network slicing. As network operators transition to next-generation networks, it is beneficial to define reference points that allow an SSF 610 to acquire charging rules for a UE to select the most appropriate network slice for that UE.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the disclosure is not limited to those specific embodiments. The scope of the disclosure is defined by the following claims and any equivalents thereof.

What is claimed is:

1. A system of a network that implements network slicing, the system comprising:
   an account charging server that determines a plurality of charging rules for User Equipment (UE) that are each mapped to a different network slice of the network;
   a policy control server that identifies the charging rules determined by the account charging server;
   a slice selection server that acquires the charging rules from the policy control server, and selects a network slice for the UE based on the charging rules; and a first interface between the policy control server and the account charging server that supports a first transaction based on Diameter protocol that includes a first request from the policy control server to the account charging server and a first response from the account charging server to the policy control server;

wherein a first Attribute Value Pair (AVP) is defined for the first response to identify a charging rule, and a second AVP is defined for the first response to identify a network slice that is mapped to the charging rule.

2. The system of claim 1 wherein:
a third AVP is defined for the first response to identify a validity timer assigned to the charging rule.

3. The system of claim 2 wherein:
the first interface comprises an Sy interface; and
the first response comprises a Diameter Spending Limit Answer (SLA) of the Sy interface.

4. The system of claim 1 wherein:
a fourth AVP is defined for the first request to specify network slicing information;
a fifth AVP is defined for the fourth AVP to identify a network slice identifier (ID);
a sixth AVP is defined for the fourth AVP to identify a service category associated with the network slice ID; and
the service category includes one of Enhanced Mobile BroadBand (eMBB), Ultra-Reliable Low-Latency Communication (uRLLC), and Massive Machine-Type Communications (mMTC).

5. The system of claim 4 wherein:
the first interface comprises an Sy interface; and
the first request comprises a Diameter Spending Limit Request (SLR) of the Sy interface.

6. The system of claim 1 further comprising:
a second interface between the slice selection server and the policy control server that supports a second transaction based on the Diameter protocol that includes a second request from the slice selection server to the policy control server and a second response from the policy control server to the slice selection server;

wherein a seventh AVP is defined for the second response to identify the charging rule, and an eighth AVP is defined for the second response to identify the network slice that is mapped to the charging rule.

7. The system of claim 6 wherein:
a ninth AVP is defined for the second response to identify a validity timer assigned to the charging rule.

8. The system of claim 7 wherein:
the second interface comprises a Gx interface;
the second response comprises a Diameter Credit Control Answer (CCA) of the Gx interface; and
the seventh AVP, the eighth AVP, and the ninth AVP are defined in a Charging-Rule-Definition AVP of the Diameter CCA.

9. The system of claim 6 wherein:
a tenth AVP is defined for the second request to specify network slicing information;
an eleventh AVP is defined for the tenth AVP to identify a network slice identifier (ID);
a twelfth AVP is defined for the tenth AVP to identify a service category associated with the network slice ID; and
the service category includes one of Enhanced Mobile BroadBand (eMBB), Ultra-Reliable Low-Latency Communication (uRLLC), and Massive Machine-Type Communications (mMTC).

10. The system of claim 9 wherein:
the second interface comprises a Gx interface; and
the second request comprises a Diameter Credit Control Request (CCR) of the Gx interface.

11. A system of a network that implements network slicing, the system comprising:
an account charging server;
a policy control server;
a slice selection server;
an Sy interface between the policy control server and the account charging server that is enhanced to indicate a plurality of charging rules for User Equipment (UE) from the account charging server to the policy control server, wherein the charging rules are each mapped to a different network slice of the network; and
a Gx interface between the slice selection server and the policy control server that is enhanced to deliver the plurality of charging rules from the policy control server to the slice selection server;
wherein the slice selection server selects a network slice for the UE based on the charging rules;
wherein a first request from the policy control server to the account charging server over the Sy interface comprises a Diameter Spending Limit Request (SLR);
wherein a first response from the account charging server to the policy control server over the Sy interface comprises a Diameter Spending Limit Answer (SLA);
wherein a first Attribute Value Pair (AVP) is defined for the Diameter SLA to identify a charging rule;
wherein a second AVP is defined for the Diameter SLA to identify a network slice that is mapped to the charging rule; and
wherein a third AVP is defined for the Diameter SLA to identify a validity timer assigned to the charging rule.

12. The system of claim 11 wherein:
a second request from the slice selection server to the policy control server over the Gx interface comprises a Diameter Credit Control Request (CCR);
a second response from the policy control server to the slice selection server over the Gx interface comprises a Diameter Credit Control Answer (CCA);
a fourth AVP is defined for the Diameter CCA to identify the charging rule;
a fifth AVP is defined for the Diameter CCA to identify the network slice that is mapped to the charging rule; and
a sixth AVP is defined for the Diameter CCA to identify the validity timer assigned to the charging rule.

13. The system of claim 12 wherein:
a seventh AVP is defined for the Diameter SLR to specify network slicing information;
an eighth AVP is defined for the seventh AVP to identify a network slice identifier (ID);
a ninth AVP is defined for the seventh AVP to identify a service category associated with the network slice ID; and
the service category includes one of Enhanced Mobile BroadBand (eMBB), Ultra-Reliable Low-Latency Communication (uRLLC), and Massive Machine-Type Communications (mMTC).

14. The system of claim 13 wherein:
a tenth AVP is defined for the Diameter CCR to specify the network slicing information;
an eleventh AVP is defined for the tenth AVP to identify the network slice ID; and
a twelfth AVP is defined for the tenth AVP to identify the service category associated with the network slice ID.

15. A method operable in a network that implements network slicing, wherein the network includes an account charging server, a policy control server, and a slice selection server, the method comprising:

implementing an Sy interface between the policy control server and the account charging server that is enhanced to indicate a plurality of charging rules for User Equipment (UE) from the account charging server to the policy control server, wherein the charging rules are each mapped to a different network slice of the network;

implementing a Gx interface between the slice selection server and the policy control server that is enhanced to deliver the plurality of charging rules from the policy control server to the slice selection server, wherein the slice selection server selects a network slice for the UE based on the charging rules;

sending a Diameter Spending Limit Request (SLR) from the policy control server to the account charging server over the Sy interface; and sending a Diameter Spending Limit Answer (SLA) from the account charging server to the policy control server over the Sy interface;

wherein a first Attribute Value Pair (AVP) is defined for the Diameter SLA to identify a charging rule;

wherein a second AVP is defined for the Diameter SLA to identify a network slice that is mapped to the charging rule; and wherein a third AVP is defined for the Diameter SLA to identify a validity timer assigned to the charging rule.

16. The method of claim 15 further comprising:

sending a Diameter Credit Control Request (CCR) from the slice selection server to the policy control server over the Gx interface; and sending a Diameter Credit Control Answer (CCA) from the policy control server to the slice selection server over the Gx interface;

wherein a fourth AVP is defined for the Diameter CCA to identify the charging rule;

wherein a fifth AVP is defined for the Diameter CCA to identify the network slice that is mapped to the charging rule; and wherein a sixth AVP is defined for the Diameter CCA to identify the validity timer assigned to the charging rule.

17. The method of claim 16 wherein:

a seventh AVP is defined for the Diameter SLR to specify network slicing information;

an eighth AVP is defined for the seventh AVP to identify a network slice identifier (ID);

a ninth AVP is defined for the seventh AVP to identify a service category associated with the network slice ID; and the service category includes one of Enhanced Mobile BroadBand (eMBB), Ultra-Reliable Low-Latency Communication (uRLLC), and Massive Machine-Type Communications (mMTC).

18. The method of claim 17 wherein:

a tenth AVP is defined for the Diameter CCR to specify the network slicing information;

an eleventh AVP is defined for the tenth AVP to identify the network slice ID; and a twelfth AVP is defined for the tenth AVP to identify the service category associated with the network slice ID.

* * * * *